(12) United States Patent
Beiler et al.

(10) Patent No.: US 12,377,922 B2
(45) Date of Patent: *Aug. 5, 2025

(54) SELF-PROPELLED TANDEM AXLE TRAILER

(71) Applicant: New Heights, LLC, Leola, PA (US)

(72) Inventors: Aaron Jay Beiler, Gap, PA (US); William Fisher, Paradise, PA (US); Raymond Beiler, New Holland, PA (US); Jeremiah Weaver, Narvon, PA (US)

(73) Assignee: New Heights LLC, Leola, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,628

(22) Filed: Sep. 27, 2023

(65) Prior Publication Data
US 2024/0017777 A1  Jan. 18, 2024

Related U.S. Application Data

(63) Continuation of application No. 17/024,809, filed on Sep. 18, 2020, now Pat. No. 11,794,831, which is a
(Continued)

(51) Int. Cl.
*B62D 59/04* (2006.01)
*B60G 11/18* (2006.01)
(Continued)

(52) U.S. Cl.
CPC ............ *B62D 59/04* (2013.01); *B60G 11/185* (2013.01); *B60K 17/02* (2013.01); *B60K 17/046* (2013.01);
(Continued)

(58) Field of Classification Search
CPC ........ B62D 59/04; B62D 9/002; B62D 12/02; B62D 63/062; B60D 1/167; B60Q 1/508; B60R 19/02
See application file for complete search history.

(56) References Cited

U.S. PATENT DOCUMENTS 3,907,364 A * 9/1975 Hnath ...................... B60P 1/34
                                                                    298/17.5
3,987,563 A    10/1976 Baur
(Continued)

FOREIGN PATENT DOCUMENTS

EP        3354506 A1    1/2018

OTHER PUBLICATIONS

PCT International Search Report and Written Opinion, Application No. US2021/050908, Dated: Jan. 12, 2022, 13 pages.

*Primary Examiner* — Valentin Neacsu
*Assistant Examiner* — Marlon A Arce
(74) *Attorney, Agent, or Firm* — Barley Snyder

(57) ABSTRACT

A trailer for towing by a power vehicle is provided and generally includes a frame and a tandem wheel assembly. The frame forms an undercarriage chassis and the tandem wheel assembly positioned under the undercarriage chassis. The tandem wheel assembly includes a rear wheel assembly and a front wheel assembly. An extension assembly is provided and moves the front wheel assembly between trailing position and a self-propelled position where the rear wheel assembly and the front wheel assembly are positioned to equally support the undercarriage chassis.

10 Claims, 20 Drawing Sheets

Related U.S. Application Data continuation-in-part of application No. 16/599,820, filed on Oct. 11, 2019, now Pat. No. 11,597,457.

(60) Provisional application No. 62/744,901, filed on Oct. 12, 2018.

(51) Int. Cl.
| | | |
|---|---|---|
| *B60K 17/02* | (2006.01) | |
| *B60K 17/04* | (2006.01) | |
| *B60K 17/14* | (2006.01) | |
| *B60K 17/22* | (2006.01) | |
| *B60K 17/30* | (2006.01) | |
| *B60K 17/34* | (2006.01) | |
| *B60K 17/356* | (2006.01) | |
| *B60P 1/44* | (2006.01) | |
| *B66F 9/065* | (2006.01) | |
| *F16D 11/14* | (2006.01) | |

(52) U.S. Cl.
CPC .............. *B60K 17/14* (2013.01); *B60K 17/22* (2013.01); *B60K 17/30* (2013.01); *B60K 17/356* (2013.01); *B60K 17/358* (2013.01); *B60P 1/44* (2013.01); *B66F 9/0655* (2013.01); *B60G 11/183* (2013.01); *B60G 2200/22* (2013.01); *B60G 2202/134* (2013.01); *B60G 2202/1362* (2013.01); *F16D 11/14* (2013.01)

(56) References Cited

U.S. PATENT DOCUMENTS

| | | | | |
|---|---|---|---|---|
| 4,132,326 | A | * | 1/1979 | Pinto ..................... B60P 1/6427 293/118 |
| 4,674,942 | A | * | 6/1987 | Assh ...................... B60P 1/6454 280/43.23 |
| 5,314,201 | A | * | 5/1994 | Wessels ............... B62D 53/068 180/209 |
| 5,332,052 | A | * | 7/1994 | Carnevale ................ B60K 5/10 180/209 |
| 5,716,071 | A | * | 2/1998 | Stanley .................. B62D 53/00 33/708 |
| 5,758,890 | A | * | 6/1998 | Wessels ............... B62D 53/067 410/91 |
| 5,863,057 | A | * | 1/1999 | Wessels ............... B62D 53/068 280/438.1 |
| 6,220,811 | B1 | | 4/2001 | Bernecker |
| 6,240,339 | B1 | * | 5/2001 | von Mayenburg ......................... B60G 17/0523 701/72 |
| 6,547,509 | B1 | * | 4/2003 | Edmo ....................... B66F 7/22 254/10 R |
| 6,817,677 | B1 | | 11/2004 | Beiler |
| 8,112,202 | B2 | | 2/2012 | Fackler et al. |
| 11,131,095 | B2 | | 9/2021 | Beiler et al. |
| 2005/0253445 | A1 | * | 11/2005 | Beiler ....................... B65F 3/00 298/22 C |
| 2008/0211289 | A1 | * | 9/2008 | Beiler ....................... B60P 1/00 298/19 R |
| 2013/0133172 | A1 | | 5/2013 | Kiener et al. |
| 2015/0217814 | A1 | | 8/2015 | Wiegel |
| 2016/0137238 | A1 | * | 5/2016 | Faymonville ........ B62D 53/067 280/423.1 |
| 2020/0114993 | A1 | | 4/2020 | Beiler et al. |

\* cited by examiner

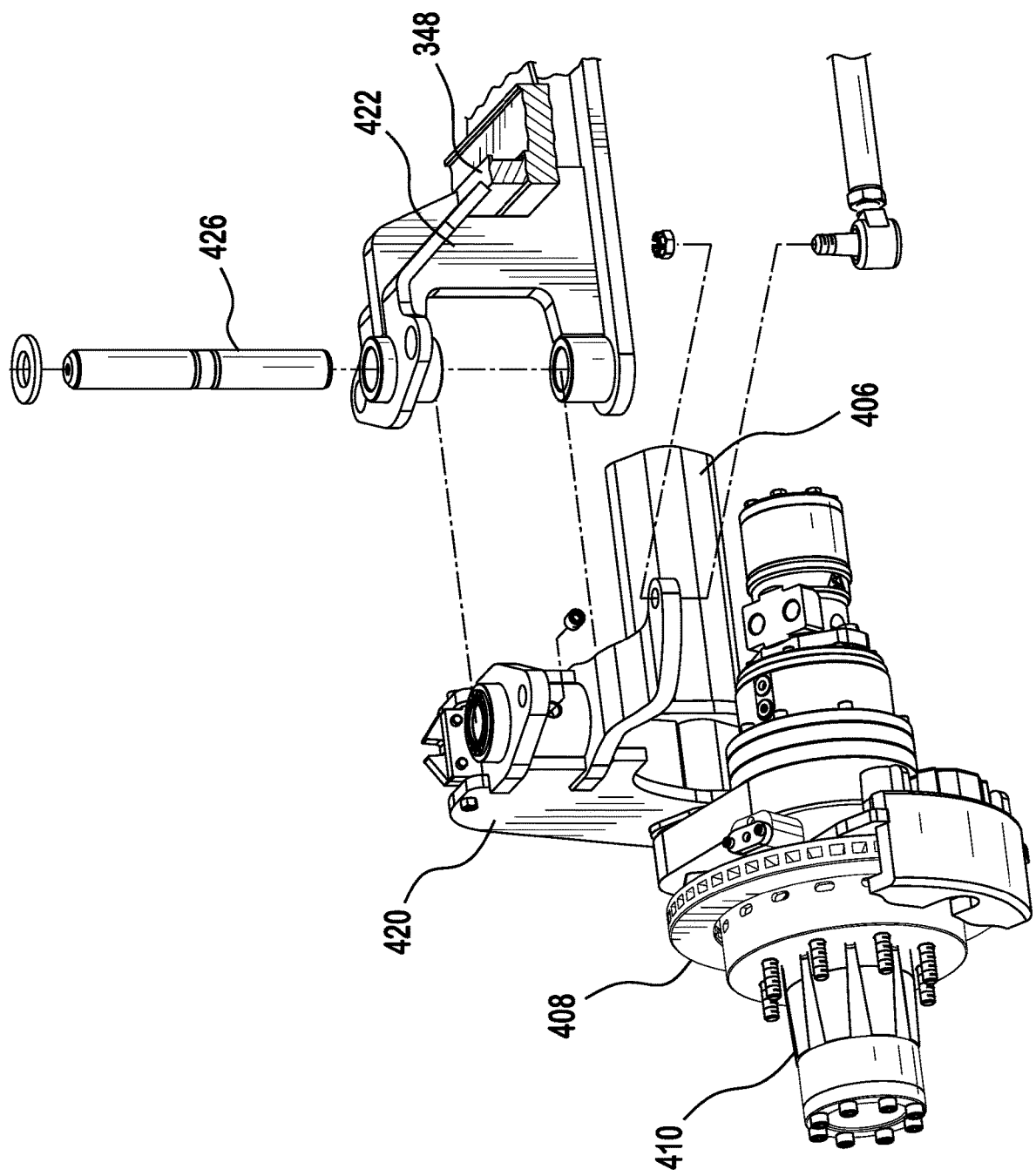

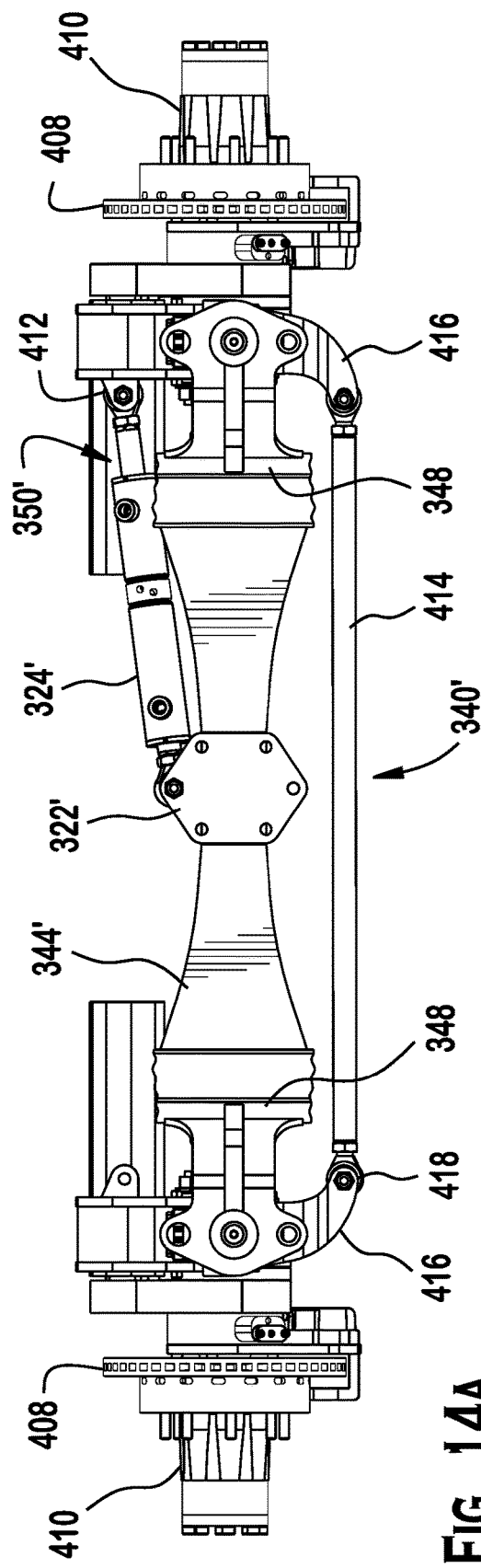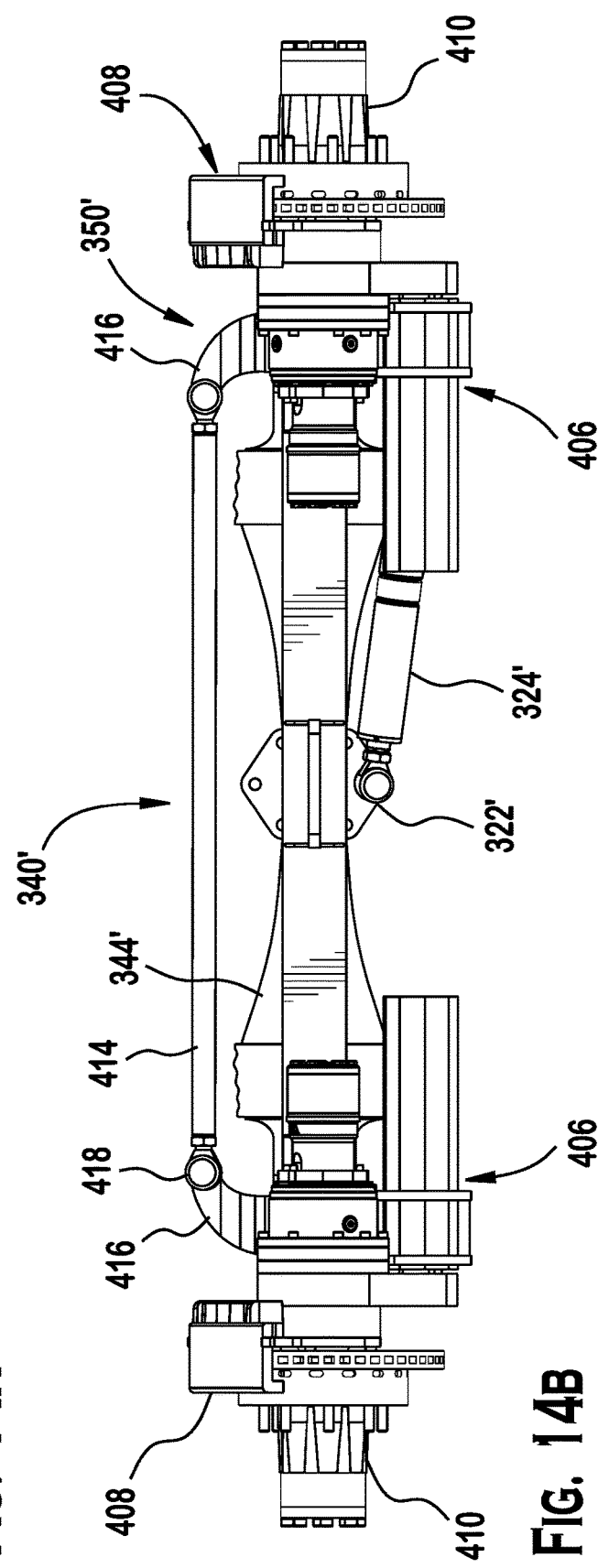
FIG. 14A
FIG. 14B

SELF-PROPELLED TANDEM AXLE TRAILER

CROSS-REFERENCE TO RELATED APPLICATION

This application is a continuation of U.S. application Ser. No. 17/024,809 filed on Sep. 18, 2020, which is a continuation-in-part of Ser. No. 16/599,820 filed on Oct. 11, 2019, which claims the benefit of the filing date of Provisional Patent Application No. 62/744,901, filed on Oct. 12, 2018.

FIELD OF THE INVENTION

The invention relates to a self-propelled tandem axle trailer and, more particularly, to a self-propelled tandem axle trailer having a rear extending storage bin and a movable front axle.

BACKGROUND

Workers often find that providing materials for replacement of a building roof is very time consuming, considering the task involves using different mechanical units or manual labor to lift building materials from a truck and position them on a roof. Furthermore, stripping old material from the building roof in order to put on a new roof is also time consuming and a dirty job. Generally, old material is thrown from the roof to the ground around the building and then workers manually pick up debris to deposit it into a disposal container. Even if the material can be thrown directly into a container there remain the problems of getting the disposal container in proximity to the roof and removal from the work site. The most common solution to the disposal problem is to move a dump truck adjacent to the building and to attempt to throw the material directly from the roof into the truck bin. Furthermore, the problem is not limited to roofing material. Any building remodeling generates significant construction trash, and the most convenient method of removing it from the building is to throw it out a window.

As a result, it is not always possible to move a large truck into a location adjacent to a building. Fences, lawns, and shrubs can be damaged by any size truck, especially a large transport truck.

There is a need for a vehicle that can move around the typical landscaped yard surrounding a building and position a storage bin into an extended position near workers and that is study enough to handle large loads.

SUMMARY

In view of the foregoing, a trailer for towing by a power vehicle is provided and generally includes a frame and a tandem wheel assembly. The frame forms an undercarriage chassis and the tandem wheel assembly positioned under the undercarriage chassis. The tandem wheel assembly includes a rear wheel assembly and a front wheel assembly. An extension assembly is provided and moves the front wheel assembly between trailing position and a self-propelled position where the rear wheel assembly and the front wheel assembly are positioned to equally support the undercarriage chassis.

In an exemplary embodiment, there is provided a trailer for towing by a power vehicle having: a frame forming an undercarriage chassis; and a tandem wheel assembly positioned under the undercarriage chassis with a rear wheel assembly including a rear wheel assembly frame, and first and second rear hub assemblies, and with a front wheel assembly including a front wheel assembly frame, and first and second front hub assemblies, where the front and rear hub assemblies each comprise a drive assembly including a motor, transmission, driveshaft, selectively engageable clutch, and hub; and an extension assembly moving the front wheel assembly between trailing position and a self-propelled position where the rear wheel assembly and the front wheel assembly are positioned to equally support the undercarriage chassis.

In an exemplary embodiment, the clutch comprises a positive clutch including a driving clutch element having a plurality of teeth, and a reversible driven clutch element having a keyed first surface, and a recessed second surface, wherein, when the reversible driven clutch element is in a first orientation and the clutch is engaged, the plurality of teeth of the driving clutch element are positively engaged with the keyed first surface of the driven clutch element for causing the rotation of the hub by the motor.

In an exemplary embodiment, the motor is configured for rotation in either direction, and is one of hydraulic motor, pneumatic motor, and electric motor. In another exemplary embodiment, the transmission is a planetary gear reduction unit to accept an input torque from the motor, and deliver a different output torque to the driveshaft. In an embodiment, the planetary gear reduction unit may receive an input torque from the motor, and provide a different output torque to the driveshaft, where the output torque to the driveshaft is a higher torque value than the value of the input torque.

In an exemplary embodiment, the reversible driven clutch element, when in a second orientation, the recessed second surface prevents engagement of the clutch.

In an exemplary embodiment, the frame includes a plurality of support beams positioned and secured apart by a plurality of connecting beams, a front support, a rear support. The front support may include a trailer connection section with a trailer hitch positioned on a leading end of the frame. In an embodiment, each of the support beams of the plurality of support beams includes a support rail. The support rail may be positioned on a lower end of the support beams, and running along a length thereof.

In an exemplary embodiment, the first and second rear hub assemblies of the rear wheel assembly and the first and second front hub assemblies of the front wheel assembly may further include a suspension assembly, a brake assembly, a hub, and a wheel. In an embodiment, each suspension assembly may be a torsion suspension system. The torsion suspension system may include an exterior housing pivotably affixed to the respective wheel assembly frame, a torsion rod contained within the exterior housing, at least one resiliently deformable element suspending the torsion rod within the exterior housing, and a torsion arm extended between the torsion rod and the hub assembly.

In an exemplary embodiment, each of the front and rear wheel assembly frames may include a body with a pair of low friction guides positioned at opposite side ends thereof and corresponding to the support rail of each of the plurality of support beams. Each of the low friction guides may be a u-shaped member having low friction pads to provide a low friction coefficient between the front wheel frame and the support rail.

In an exemplary embodiment, each of the rear wheel assembly and front wheel assembly may further comprise a steering assembly.

In an exemplary embodiment, the trailer may further comprise a storage bin and an extension device connected to the frame and the storage bin to move the storage bin away from the frame. The storage bin may provide a platform extending substantially parallel with the frame. The extension device may include a first extension section rotatably connected the frame and a second extension section rotatably connected to the first extension section, and a storage bin platform section connected to the second extension section. The second extension section may be expandable and include a boom support, a sliding support received by the boom support, a sliding mechanism moving the sliding support relative to the boom support. Furthermore, the second extension section may further include an upper lifting actuator assembly connected to the frame and the boom support to extend and move the boom support relative to the frame.

BRIEF DESCRIPTION OF THE DRAWINGS

The invention is explained in greater detail below with reference to embodiments and the appended drawings of which:

FIG. 13 is a partially exploded view of the mounting of a wheel hub assembly to the wheel assembly frame;

FIG. 14A is a top view of an alternative embodiment of a wheel assembly of the self-propelled tandem axle trailer according to the invention;

FIG. 14B is a bottom view of an alternative embodiment of a wheel assembly of the self-propelled tandem axle trailer according to the invention;

DETAILED DESCRIPTION OF THE EMBODIMENT(S)

Figure 1:
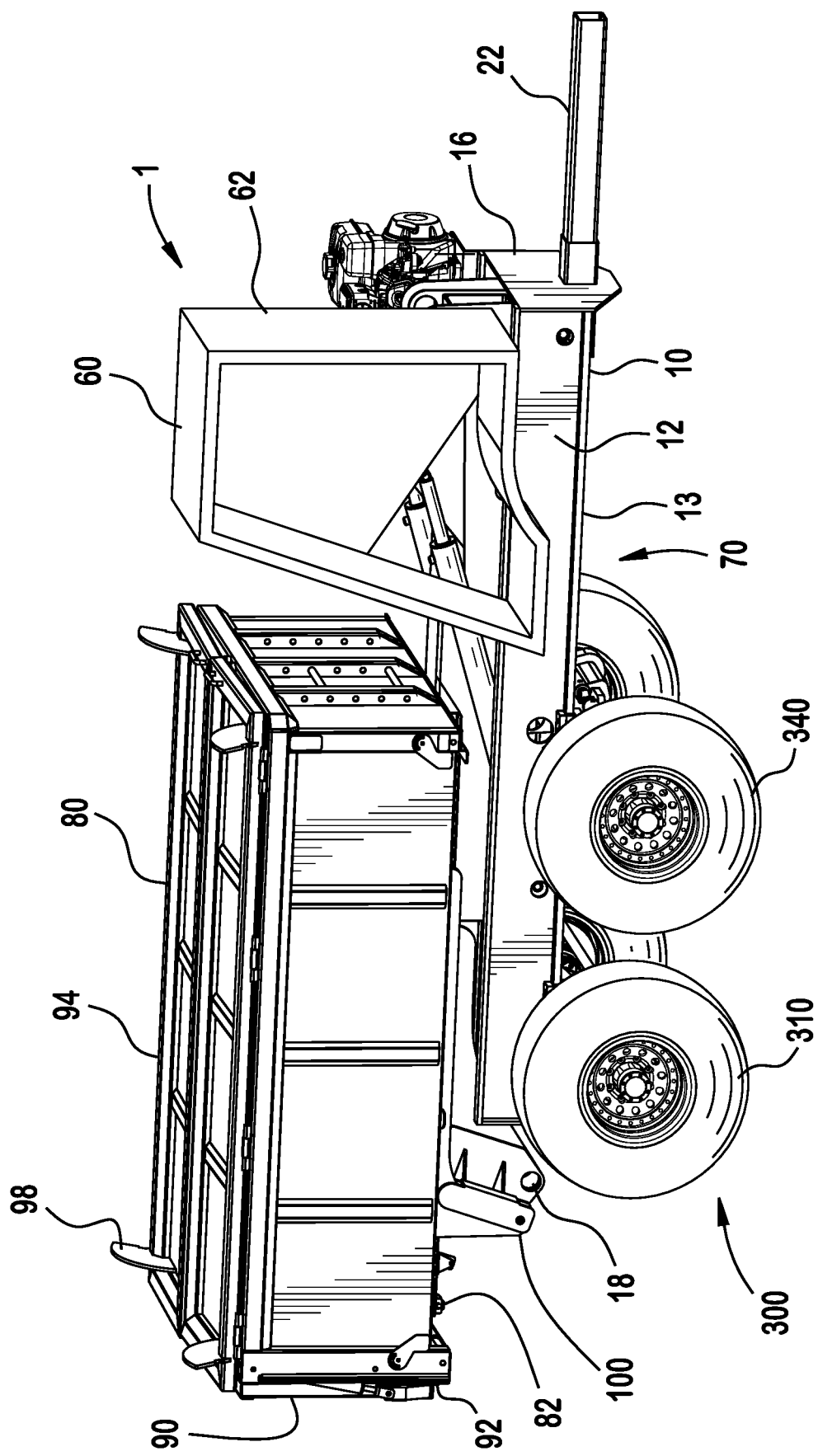
FIG. 1 is a front perspective view of a self-propelled tandem axle trailer according to the invention.

With respect to FIGS. 1-6, a trailer 1 according to the invention is shown and ready for towing by a power vehicle, such as a truck with a tow hitch, though it is contemplated that various aspects of the description may also be applicable to the alternative embodiment contemplated herein, except where indicated otherwise by the figures. The trailer 1 generally includes the following major components: a frame 10, a control system 60, a storage bin 80, and an extension device 100, and a tandem wheel assembly 300.

Now with reference to FIGS. 1-4, the frame 10 will be discussed. In the shown embodiment, the frame 10 includes a plurality of support beams 12, a plurality of connecting beams 14, a front support 16, a rear support 18, a trailer connection section 22.

Figure 2:
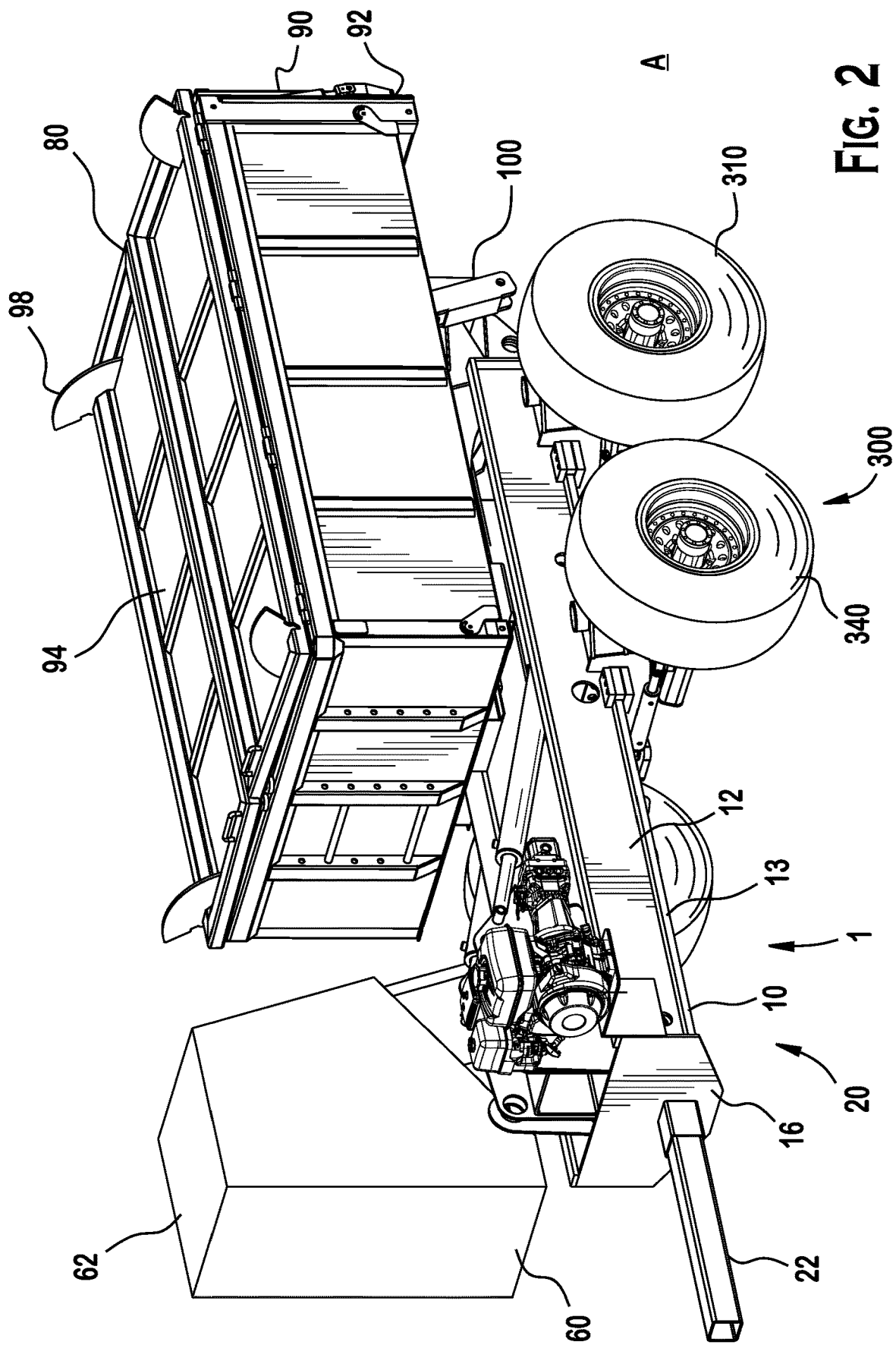
FIG. 2 is rear perspective view of the self-propelled tandem axle trailer of FIG. 1.
Figure 3:
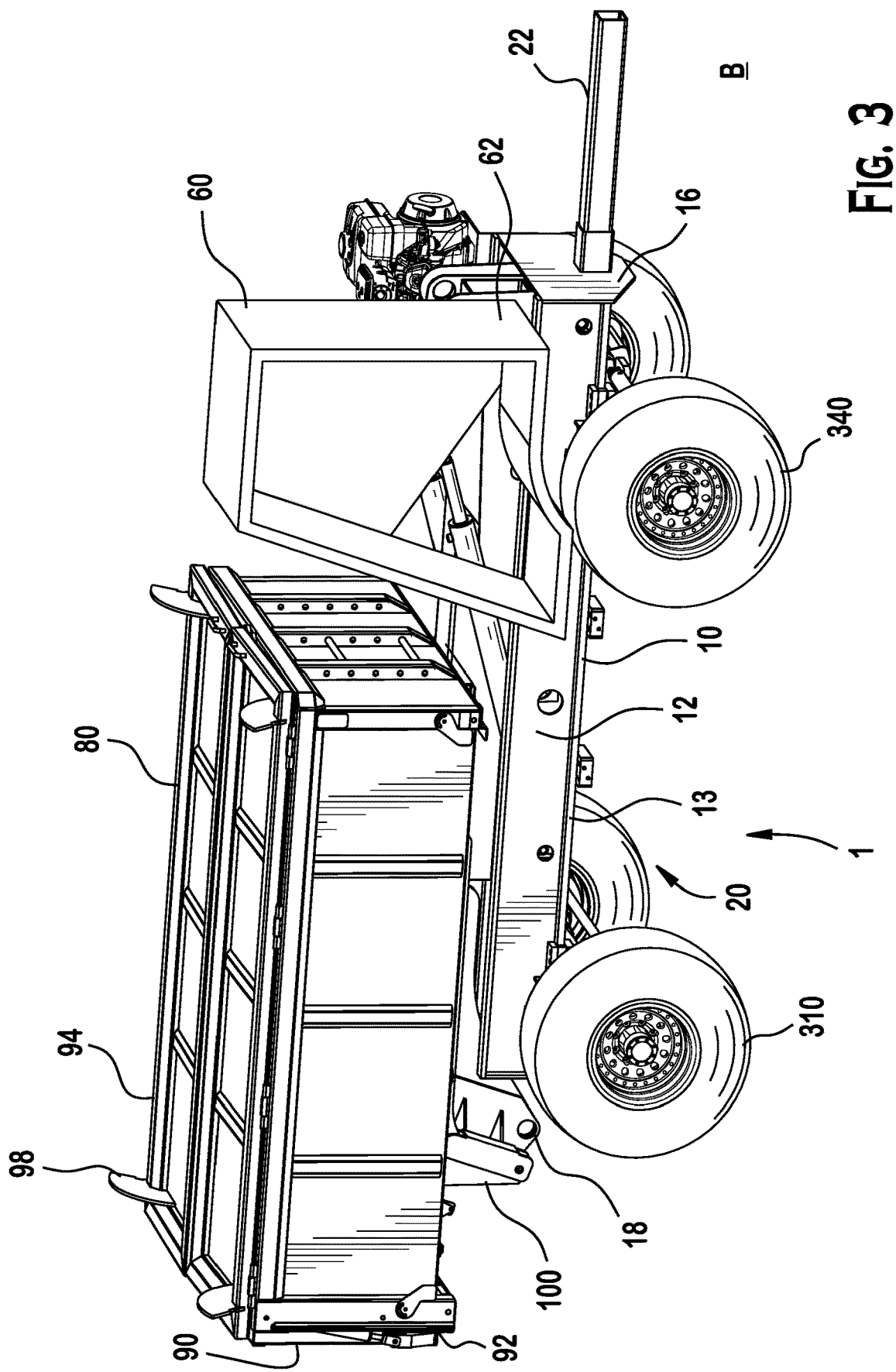
FIG. 3 is perspective view of a self-propelled tandem axle trailer according to the invention, showing extension of a front axle to a drivable position.
Figure 4:
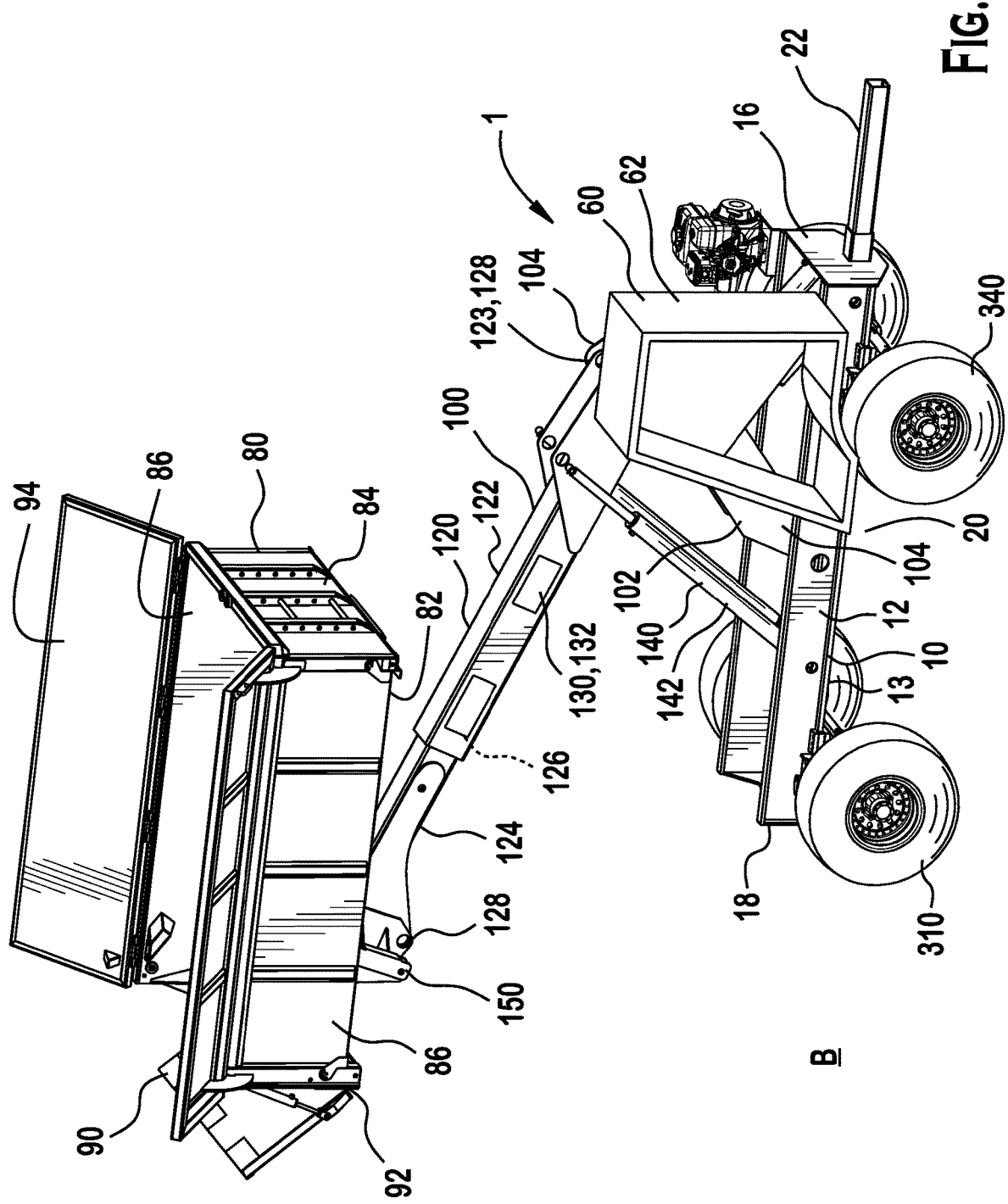
FIG. 4 is another perspective view of the trailer of FIG. 3, showing extension and inclination of a storage bin thereof.
Figure 5:
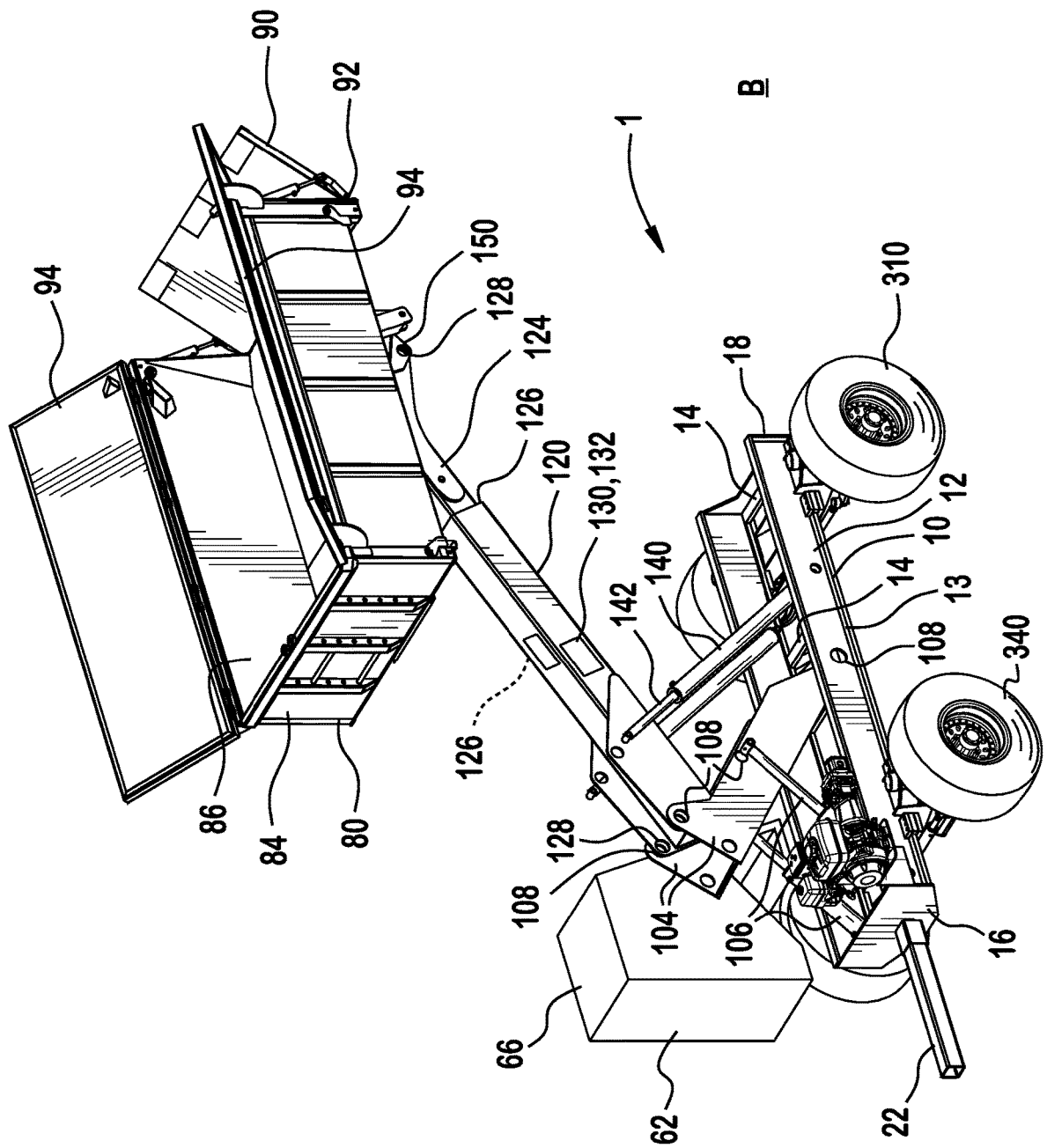
FIG. 5 is a front perspective view of the trailer of FIG. 3, showing further extension and inclination of the storage bin.
Figure 6:
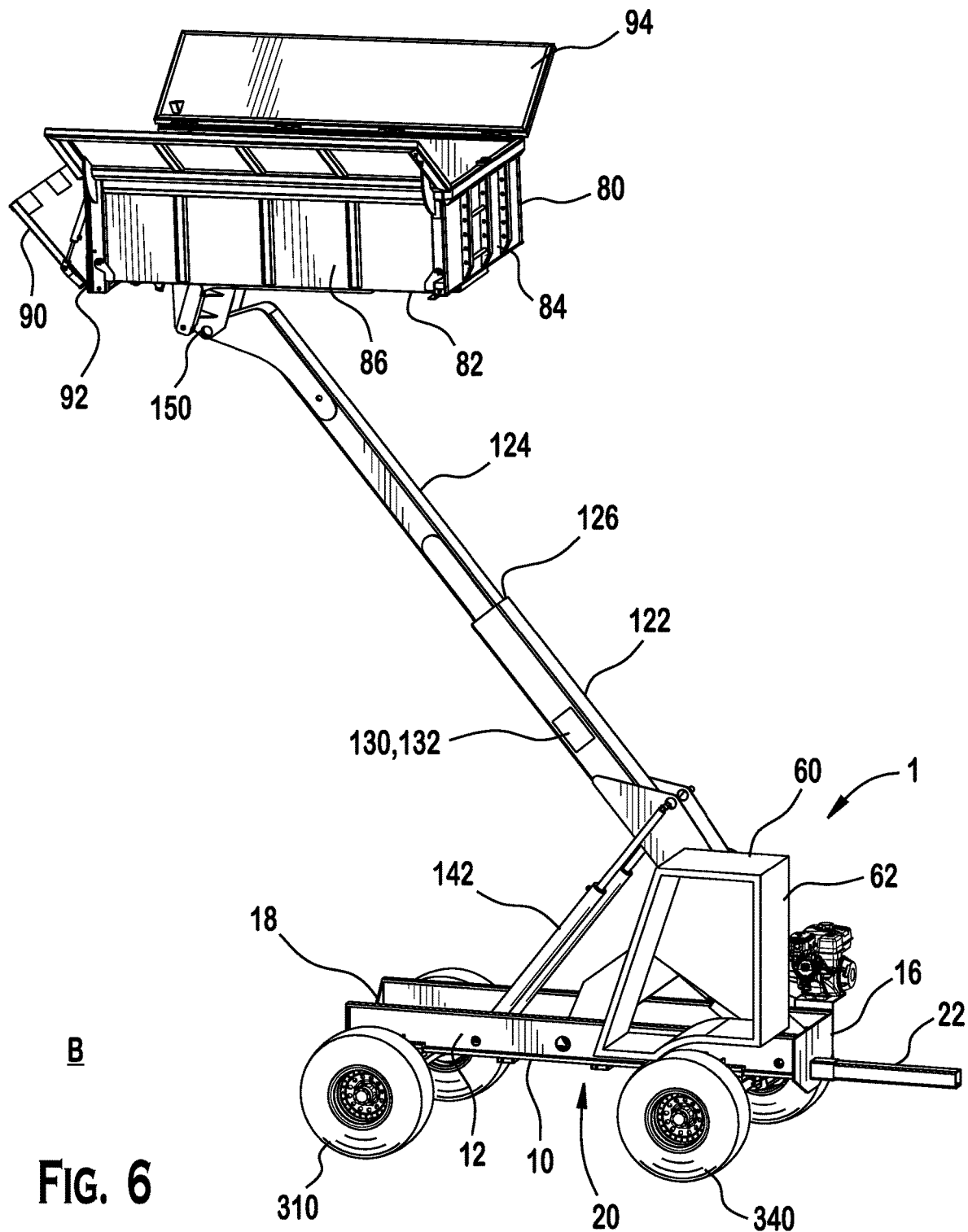
FIG. 6 is a rear perspective view of the trailer of FIG. 5.

As shown in FIGS. 2 and 3, each support beam 12 is an elongated metal support extending along a length of the frame 10, from a trailing end to a leading end thereof.

In the embodiment shown, each support beam 12 is I-shaped and includes a support rail 13 positioned on a lower end and running along a length thereof.

Each connection beam 14 runs substantially perpendicular and connecting to the plurality of support beams 12. The front support 16 is a plate like member connecting the support beams 12 at a front end thereof, while the rear support is another plat like member connecting the support beams 12 at an opposite end thereof. As assembled, the support beams 12, connection beams 14, front support 16, and rear support form a undercarriage chassis 20

As shown, in an exemplary embodiment of the invention, the trailer connection section 22 is a trailer hitch 22 positioned and connected to a leading end of the frame 10, and, in particular, the front support 16. The trailer hitch 22 includes a connector for connecting with a truck (i.e., ball mount; not shown).

According to the invention, the trailer 1 includes a tandem wheel assembly 300. In an exemplary embodiment of the invention, the tandem wheel assembly 300 is positioned under the undercarriage chassis 20 and generally includes a rear wheel assembly 310, a front wheel assembly 340, and an extension assembly 380.

Figure 8:
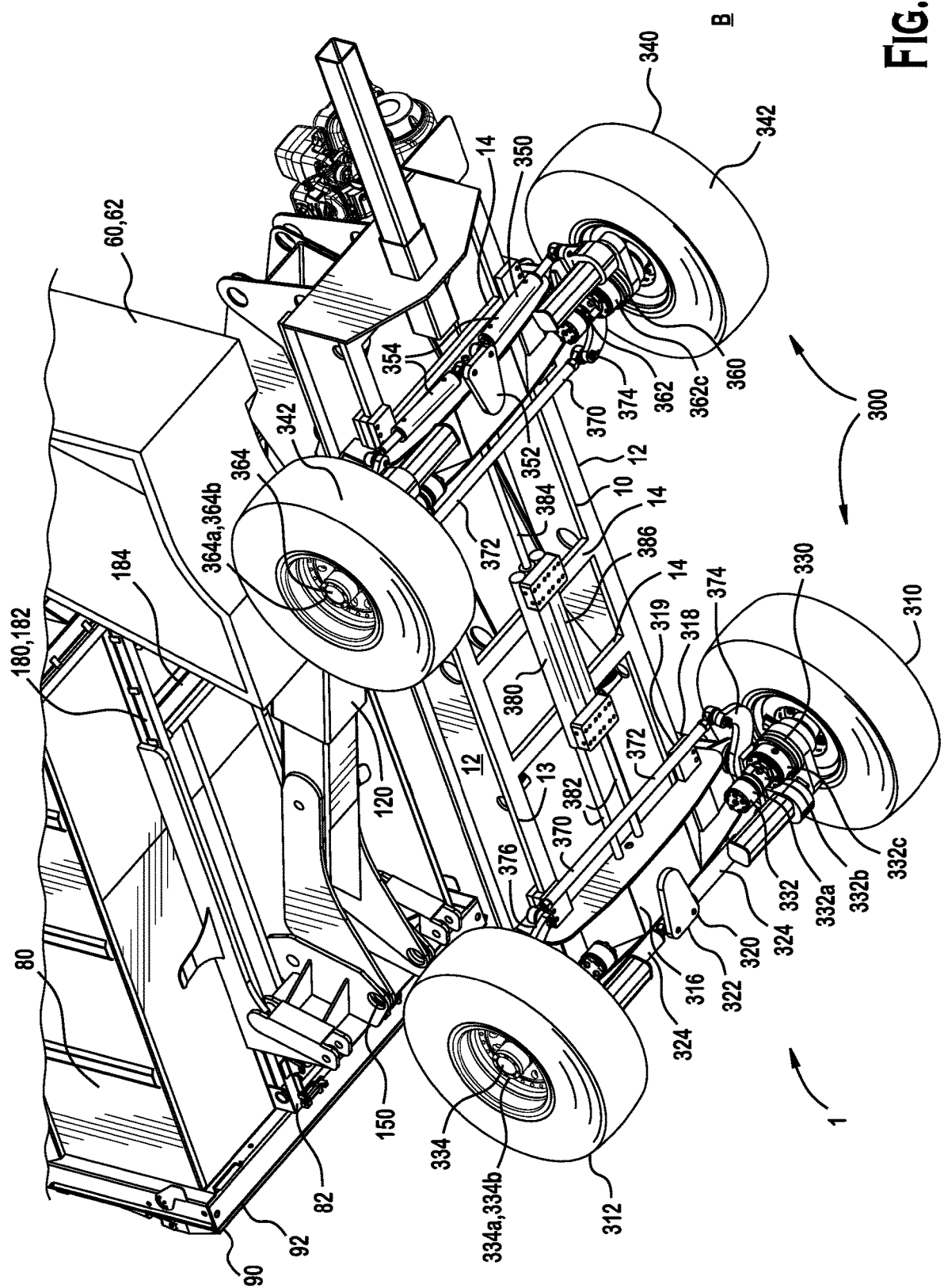
FIG. 8 is a bottom perspective view of the self-propelled tandem axle trailer according to the invention.

As shown in FIGS. 8, the rear wheel assembly 310 includes a pair of rear wheels 312, a rear wheel frame 314, a rear steering assembly 320, and a rear drive assembly 330.

In the embodiment shown, the rear wheel frame 314 includes a rear guide member 315 member having a body 316 and a pair of low friction guides 318 positioned at opposite side ends thereof. Each low friction guide 318 is a u-shaped member secured to the rear wheel frame 314 and is sized and shaped to correspond to receive the support rail 13. The low friction guide 318 includes low frictions pads 319 are bearing pads known in the art to provide a low friction coefficient between the rear wheel frame 314 and the support rail 13. In the shown embodiment, the low friction pads 319 line an inside surface of the low friction guide 318.

In the embodiment shown, the rear wheel assembly 310 includes steering capability using a rear steering assembly 320 according to the invention. However, one skilled in the art should appreciate that these rear wheels 312 may be non-steerable. As shown, the rear steering assembly includes a steering bracket 322, a pair of steering arms 324 connected to the steering bracket 322 and the pair of rear wheels 312.

As shown in FIG. 8, in an exemplary embodiment of the invention, the rear wheel assembly 310 includes a rear drive assembly 330 according to the invention. In an exemplary embodiment of the invention, the rear drive assembly 330 includes a hydraulic motor assembly 332 and a rotor assembly 334, and an engagement assembly 370 for each rear wheel 312.

In an embodiment of the invention, the hydraulic motor assembly 332 generally includes a motor 332a, a motor drive mechanism 332b, and a motor housing 332c. The motor 332a is connected to the control system 60 using hydraulic lines (not shown). The motor 332a is attached to the outside of the motor housing 332c. The motor drive mechanism 332b positioned in a motor housing 332c is engageable with the hydraulic motor 332a and moveable by the engagement assembly 370.

In an embodiment of the invention, the rotor assembly 334 includes a wheel hub 334a and a drive shaft 334b with a rotor drive mechanism (not shown) engageable with the motor drive mechanism 332b by the engagement assembly 370. The drive shaft 334b connected to the wheel hub 334a.

Many of the power system components are not shown for sake of complexity in the drawings, although a discussion is provided for purposes of enabling one skilled in the art to understand how the drive system is assembled and performed. One skilled in art should appreciate that other designs are possible. For instance, the rear drive assembly 330 may include other methods to move the rear wheels 312, including chains, belts, or a drive shaft and a transmission connected to a combustion or electric engine, so that trailer 1 can be moved around a work site under its own power.

Figure 7:
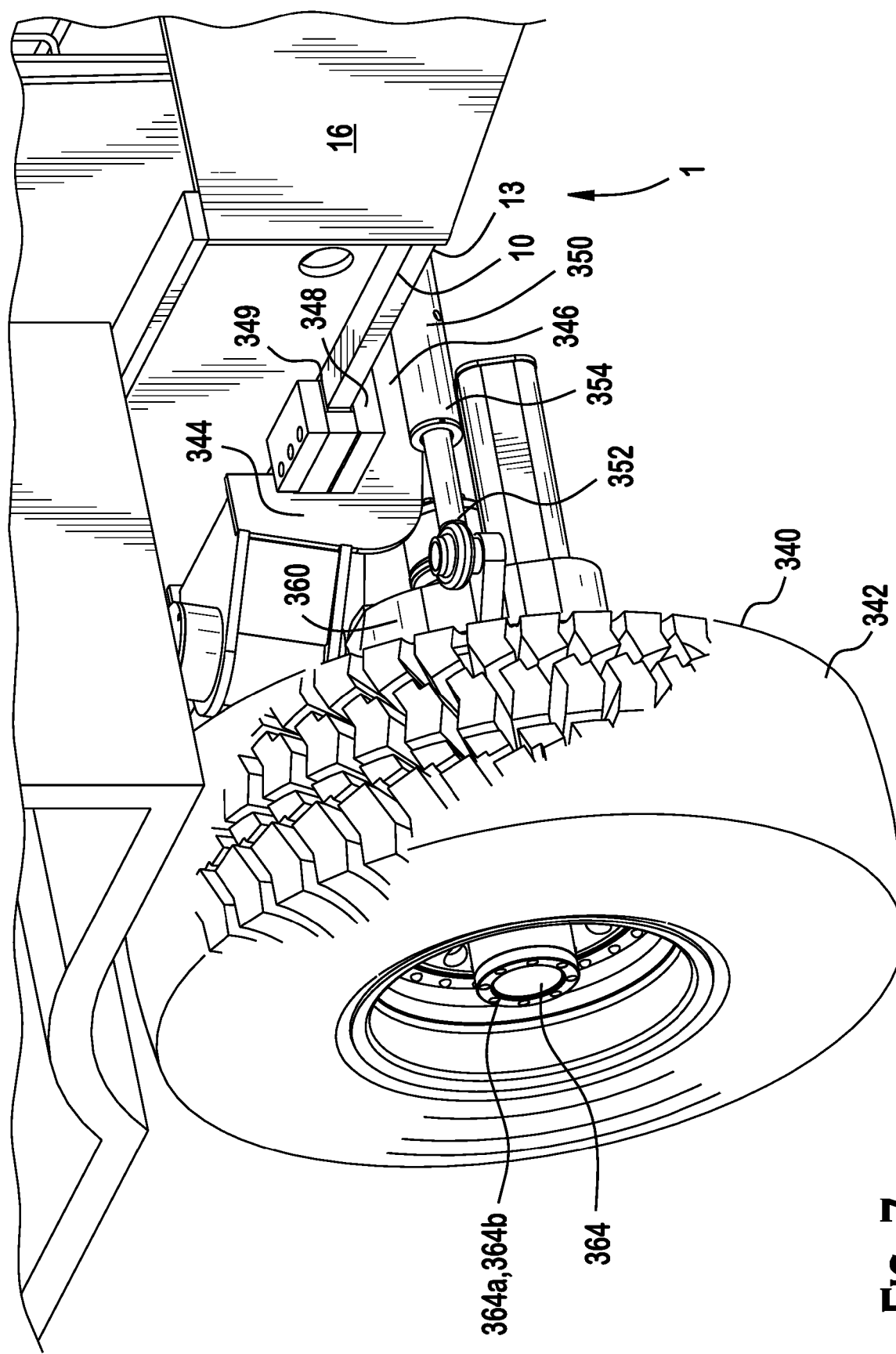
FIG. 7 is a close up view of a front wheel of the self-propelled tandem axle trailer according to the invention.

As shown in FIGS. 7 and 8, the front wheel assembly 340 includes a pair of front wheels 342, a front wheel frame 344, a front steering 350 assembly, and a front drive assembly 360.

In the embodiment shown, the front wheel frame 344 is u-shaped member having a body 346 and a pair of low friction guides 348 positioned at opposite side ends thereof. Each low friction guide 348 is a u-shaped member secured to the front wheel frame 344 and is sized and shaped to correspond to receive the support rail 13. The low friction guide 348 includes low frictions pads 349 that are bearing pads known in the art to provide a low friction coefficient between the front wheel frame 344 and the support rail 13. In the shown embodiment, the low friction pads 349 line an inside surface of the low friction guide 318.

In the embodiment shown, the front wheel assembly 340 includes steering capability using a front steering assembly 350 according to the invention. However, one skilled in the art should appreciate that this front wheels 342 may be non-steerable. As shown, the front steering assembly includes a steering bracket 352, a pair of steering arms 354 connected to the steering bracket 352 and the pair of front wheels 342.

As shown in FIG. 8, in an exemplary embodiment of the invention, the front wheel assembly 340 includes a front drive assembly 360 according to the invention. However, one skilled in the art should appreciate that these front wheels 342 may be non-driveable, without a drive system.

In an exemplary embodiment of the invention, the front drive assembly 360 generally includes a hydraulic motor assembly 362 and a rotor assembly 364, and an engagement assembly 370 for each front wheel 342.

In an embodiment of the invention, the motor assembly 362 generally includes a motor 362a, a motor drive mechanism 362b, and a motor housing 362c. The motor 362a is connected to the control system 60 using hydraulic lines (not shown). The motor 362a is attached to the outside of the motor housing 362c. The motor drive mechanism 362b positioned in a motor housing 362c is engageable with the hydraulic motor 362a and moveable by the engagement assembly 370.

In an embodiment of the invention, the rotor assembly 364 includes a wheel hub 364a and a drive shaft 364b with a rotor drive mechanism (not shown) engageable with the motor drive mechanism 362b by the engagement assembly 370. The drive shaft 364b connected to the wheel hub 364a.

Many of the power system components are not shown for sake of complexity in the drawings, although a discussion is provided for purposes of enabling one skilled in the art to understand how the drive system is assembled and performed. One skilled in art should appreciate that other designs are possible. For instance, the front drive assembly 360 may include other methods to move the front wheels 342, including chains, belts, or a drive shaft and a transmission connected to a combustion or electric engine, so that trailer 1 can be moved around a work site under its own power.

In the shown embodiment, the rear wheel assembly 310 and the front wheel assembly 340 includes an engagement assembly 370. As shown, each engagement assembly 370 generally includes a main shaft 372, a first lever assembly 374, and a second lever assembly 376. The main shaft 372 is an elongated cylindrical member and connected to the first lever assembly 374 and the second lever assembly 376 at opposite ends thereof. The first lever assembly 374 and the second lever assembly 376 are connected to opposite rear wheels 312 or front wheel 342, and engage and disengage the motor drive mechanism 332b, 362b, from the rotor drive mechanism (not shown) to rotate the wheel hub 334a, 364a.

In an exemplary embodiment of the invention, the extension assembly 380 generally includes a rear end connector 382, a moveable axle connector 384, and a moving component 386. The rear end connector 382 is connected to the rear wheel assembly 310, while the moveable axle connector 384 is connected to the front wheel assembly 340. The moving component 386 is a hydraulic actuator positioned and secure to the undercarriage chassis 20 in the shown embodiment. The moving component 386 is capable of extension and contraction. When connected to the front wheel assembly 340, the front wheels 342 can be positioned between the trailing position A (see FIGS. 1 and 2) and the self-propelled position B (see FIGS. 5-8).

With respect to FIGS. 9-17, an alternate exemplary embodiment of the invention will be described.

Figure 9A:
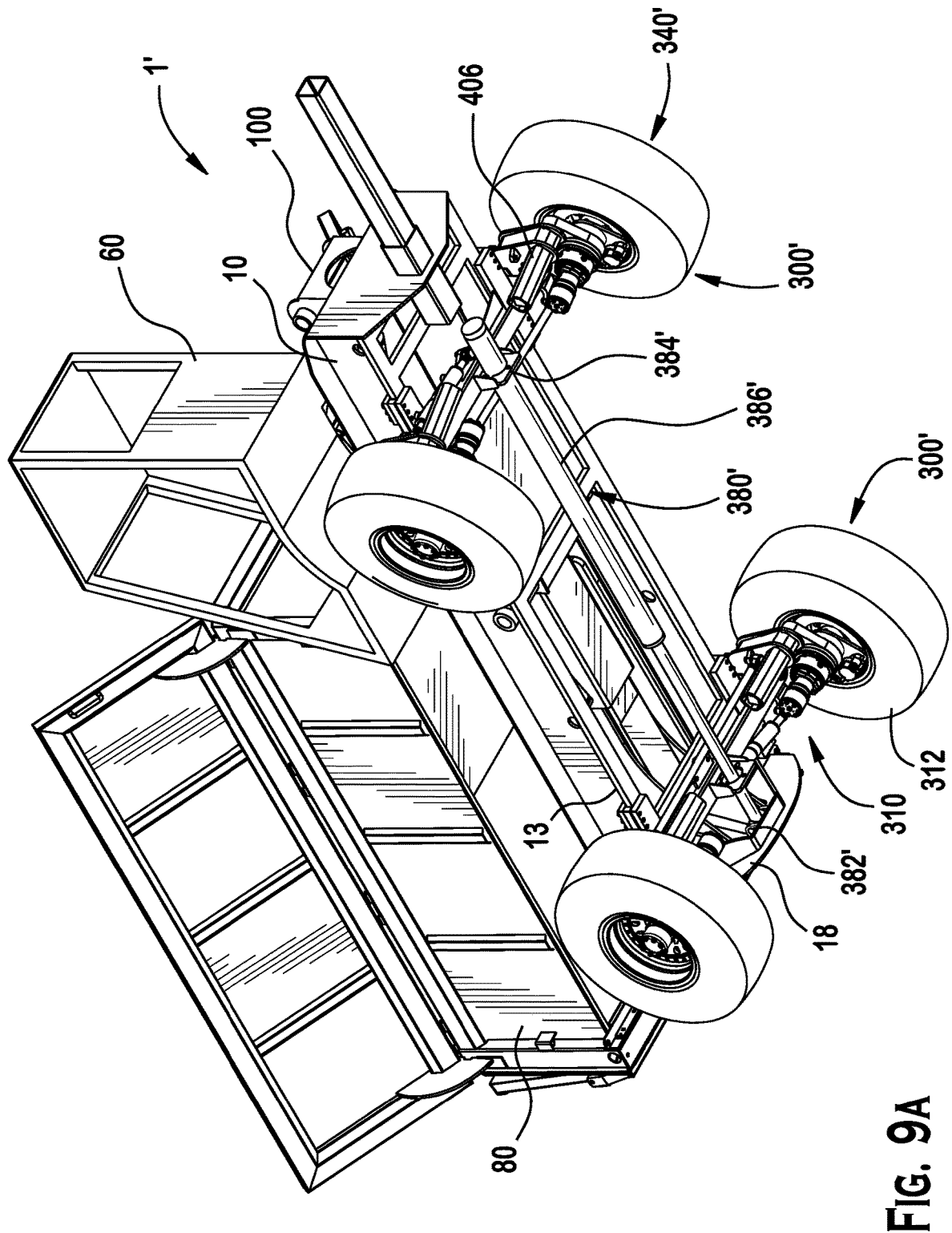
FIG. 9A is a bottom perspective view of another embodiment of the self-propelled tandem axle trailer according to the invention.
Figure 9B:
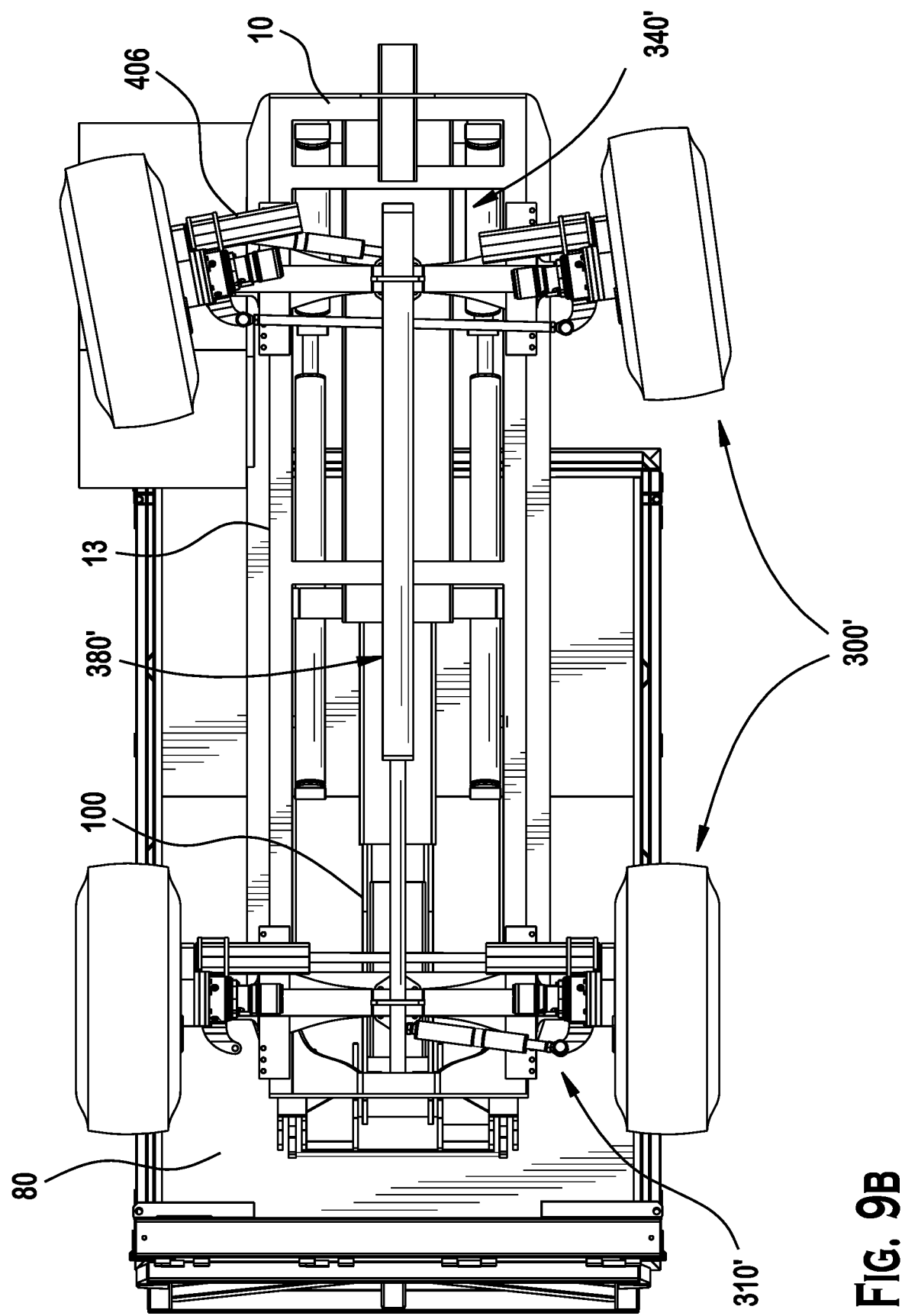
FIG. 9B is a bottom view of the self-propelled tandem axle trailer of FIG. 9A.

FIGS. 9A and 9B depict a trailer 1' generally having the following major components: a frame 10, a control system 60, a storage bin 80, and an extension device 100, and an alternate tandem wheel assembly 300'. Though not depicted in FIG. 9A or B, it is contemplated that the trailer 1' would beneficially include a source of power, similar to the exemplary power source depicted in FIGS. 1-6, and 8 and, may, in an embodiment, be one or more of batteries and/or combustion engines. The power source may power or otherwise enable the powered movement and actions of the various features of the trailer described herein, including power for self-propelled transport, steering, braking, extension and/or retraction of the tandem wheel assembly, and movement of the storage bin, relative to the frame.

As shown in FIG. 9A, the alternate tandem wheel assembly 300' is positioned under the frame 10, and generally includes a rear wheel assembly 310', a front wheel assembly 340', and an extension assembly 380'. As described previously, the tandem wheel assembly provides for a front wheel assembly that is movably secured to the support rails 13, such that the front wheel assembly can selectively be positioned in the trailing position A (seen with reference to FIGS. 1 and 2), and the self-propelled position B, depicted in FIG. 9A, or any intervening position between them.

In any of the trailer embodiments, the front wheel assembly 340' may optionally be secured in either, or both, of the position A or B, by an actuatable locking mechanism, such as a manually or mechanically engaged locking mechanism, for example, locking pins, and the like, that secure the wheel assembly and frame elements so as to prevent unwanted movement relative to each other. Alternatively, the front wheel assembly may be maintained in the desired position through the actuation mechanism, for example, maintaining hydraulic pressure in a hydraulic actuator to secure the front wheel assembly in the desired position, such as when travelling, trailering, or parked and at rest.

FIG. 9A depicts the rear wheel assembly 310' having a pair of rear wheels 312, mounted to the hubs of the wheel assembly. Further aspects of a wheel assembly are discussed below. In an embodiment, the rear wheel assembly 310' may be fixedly secured in a position relative to the frame; for example, the rear wheel assembly may be immovably secured to the support rails 13. The rear wheel assembly may be affixed or secured using techniques known to those skilled in the art. For example, the rear wheel assembly may be mounted to the frame 10 or support rails 13 through the use of one or more fasteners, including for example, mounting posts, bolts and/or nuts, to secure the wheel assembly to the support rails or other frame portion; or alternatively, a portion of the rear wheel assembly may be welded to the support rails 13 or other portion of the frame 10.

Figure 10:
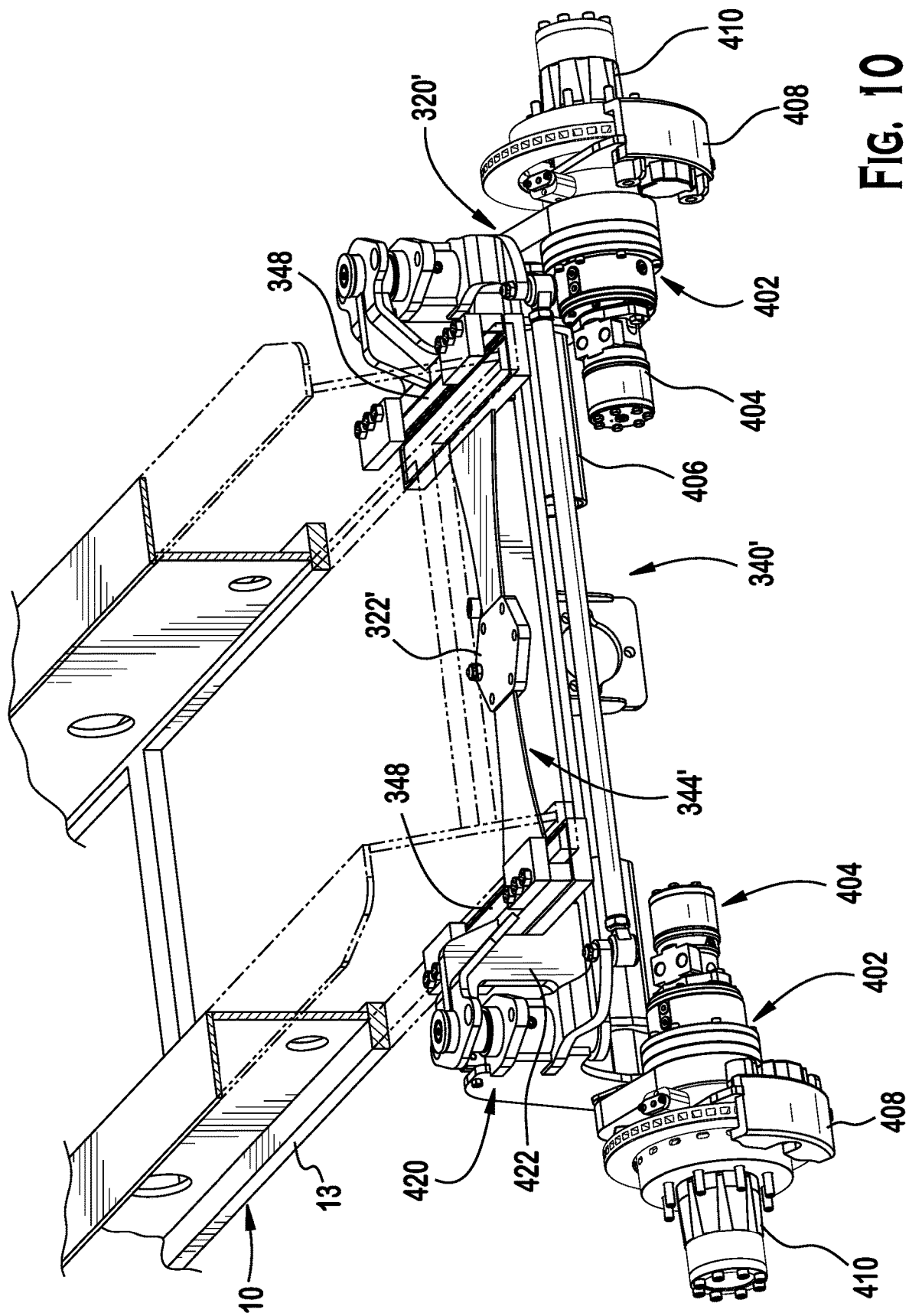
FIG. 10 is a perspective front partial view of an alternative embodiment of a front wheel assembly of the self-propelled tandem axle trailer according to the invention.
Figure 11A:
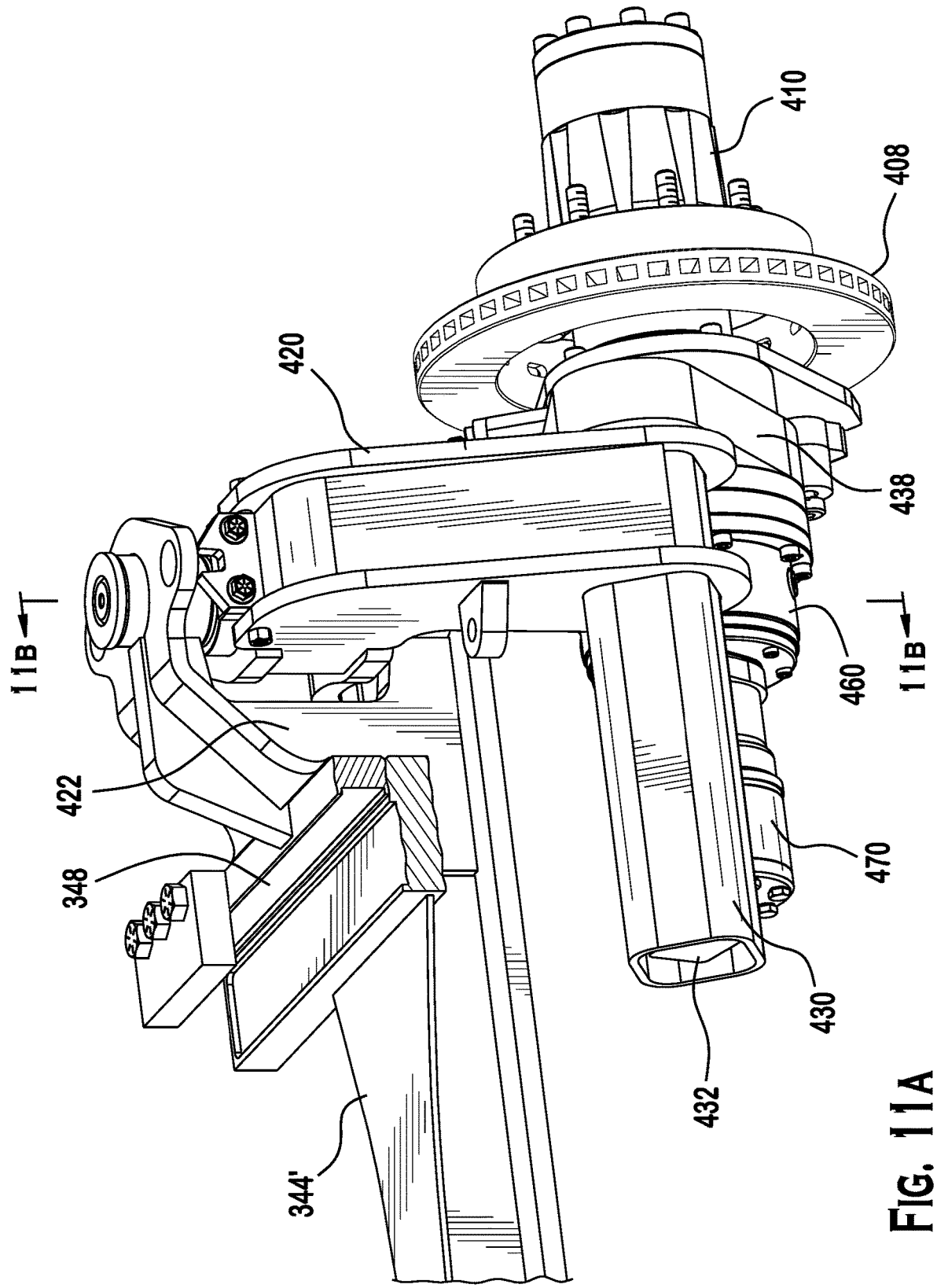
FIG. 11A is a close up, rear view of a suspension, drive and hub assembly of the self-propelled tandem axle trailer according to the invention.
Figure 11B:
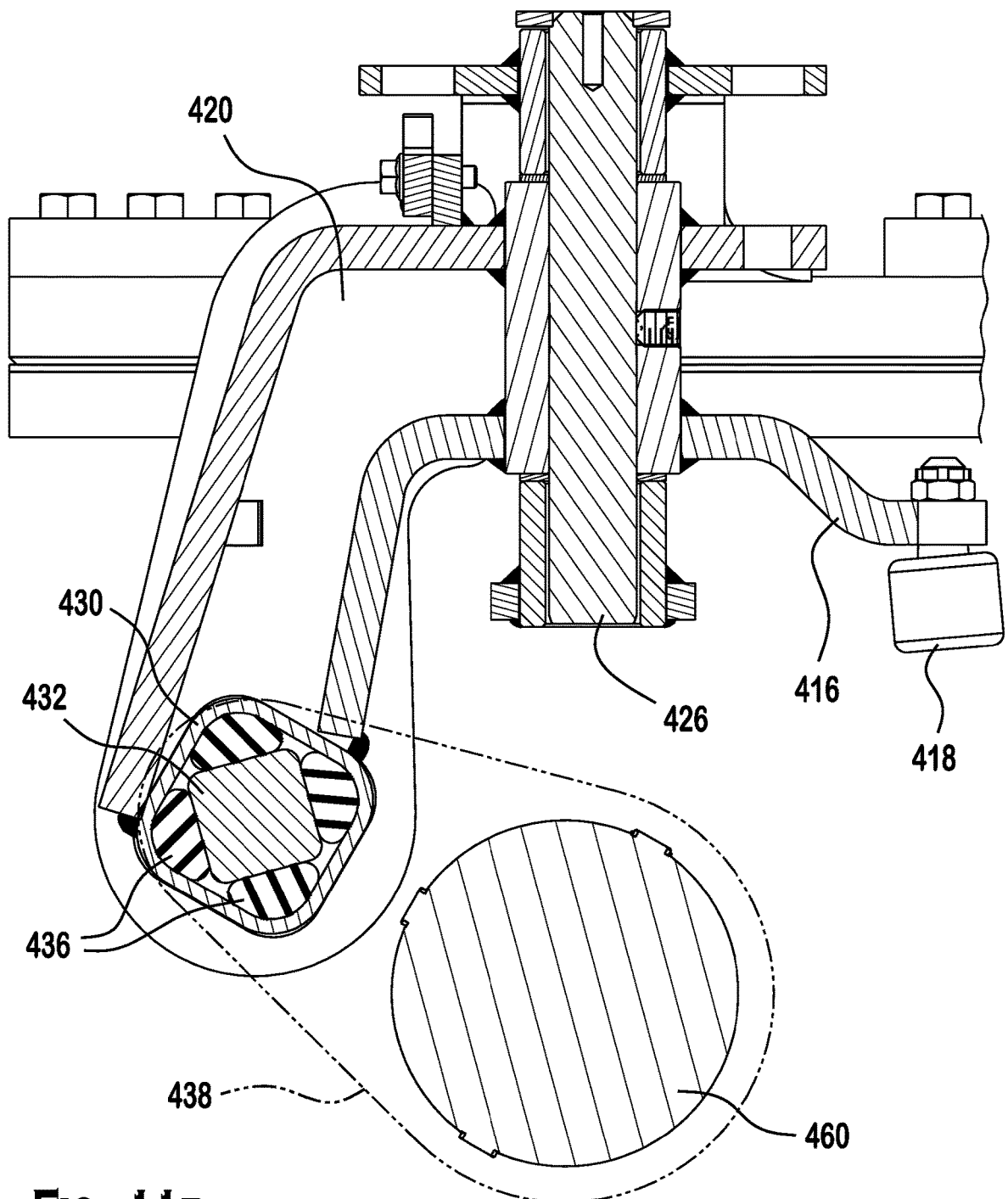
FIG. 11B is cross-section view of the suspension components of FIG. 11A.

Also depicted in FIG. 9A is a front wheel assembly 340', having a pair of wheels 342, mounted on hubs of the front wheel assembly. In an embodiment, the front wheel assembly is movably mounted upon the frame 10 of the trailer; for example, by the use one or more u-shaped members slidably mounted on the front wheel frame, where the u-shaped member is sized and shaped to receive at least a portion of the support rail 13 of the frame, as depicted in FIGS. 9 and 10. The u-shaped member may be provided with low friction guide elements 348, including low friction pads 349 that serve as bearing pads known in the art to provide a low friction coefficient between the front wheel frame 344' and the support rail 13. In this manner, the front wheel assembly is movably secured to the frame in a manner that allows the wheel assembly to slide upon the frame support rails, and be alternately positioned in a trailer position A (depicted in FIG. 1), and the self-propelled position B as depicted in FIG. 9, or any point in between. As can be seen in the exemplary embodiment of FIG. 10, the front wheel assembly 340' is provided with u-shaped members slidably mounted on separate, parallel support rails 13 on the frame 10, and are positioned such that the u-shaped members prevent twisting movement of the front wheel assembly, relative to the frame, as the spacing provided between the inside dimensions of the opposing u-shaped members is substantially the same, or nearly the same, as the maximum width dimension of the support rails 13.

In an exemplary embodiment of the invention, as depicted in FIG. 9A, the extension assembly 380 generally includes a fixed end connector 382' that may be affixed to the frame at or near the rear support plate 18, though it is contemplated that alternatively, the connector 382' may be secured to the rear wheel assembly, which is itself fixed relative to the frame. The extension assembly 380 further provides a moveable axle connector 384', and a moving component 386'. The fixed end connector 382', as depicted in FIG. 9A may be directed through a bracket opening on the rear wheel assembly 310' and affixed to the rear support plate 18 of the frame 10. The fixed end connector 382' may alternatively be secured to the frame 10 at any point rearward of the front axle when in trailering position A of FIG. 1, so as the extension assembly is extended, the forward axle assembly is urged away from the fixation point on the frame. Though not shown, it is contemplated that the extension assembly may be configured in the reverse orientation (not depicted), where an extension assembly is alternatively secured to the frame at a mounting point forward of the front axle when in position B of FIG. 3, where extension of the extension assembly urges the front axle rearward into position A for trailering, and retraction of the extension assembly urges the front axle to position B for self-propelled movement of the trailer.

In an embodiment, as depicted in FIG. 9A, the fixed end connector 382' near the rear of the trailer may be the end portion of a linear actuator of the extension assembly 380', which may fit into a bracket and secured in place against the rear support plate 18 of the frame 10. The extension assembly 380' further provides for a moveable axle connector 384' on the front wheel assembly 340'. In an embodiment, the front wheel assembly 340' may have a bracket that secures to a portion of the linear actuator 380' and serves as the moveable axle connector 384', as depicted in FIG. 9A. The moving component 386' may be any suitable form of linear actuator, for example, a hydraulic actuator positioned and secured to the undercarriage chassis 20, or frame 10'. The moving component 386' is capable of extension and contraction. In an embodiment, the moving component 386' is a double acting hydraulic cylinder. In an embodiment, the front wheel assembly 340' is secured to a portion of the cylinder barrel of the hydraulic cylinder, and the piston rod is secured to the rear of the frame. It is contemplated that where the moving component is a hydraulic cylinder, the positioning of the cylinder components may be mounted in reverse, with the piston rod affixed to the front wheel assembly, and the cylinder barrel secured to frame 10 closer to the rear of the trailer 1', or alternatively, directly connected to the rear wheel assembly 310'. It is contemplated, that in any mounting configuration where the linear actuator is connected to the front wheel assembly 340', the front wheel assembly 340' can selectively be positioned between the trailing position A (see FIGS. 1 and 2) and the self-propelled position B (see FIGS. 9A and B), by the action of the linear actuator.

Details of the front wheel assembly 340' and rear wheel assembly 310' will now be discussed with reference to FIGS. 10 and 14A and B. For simplicity, the front wheel assembly 340' will be described, though applicable to the features of the rear wheel assembly 310' as well. An isolated front wheel assembly 340' is depicted in FIG. 10 in front perspective view. FIG. 14A presents a top view of the isolated wheel assembly, with the u-shaped brackets removed for clarity. FIG. 14B presents a bottom view of the isolated wheel assembly. It is anticipated that the depicted wheel assembly in FIGS. 10 and 14 may be deployed as one or both of the front wheel assembly or rear wheel assembly. With reference to FIGS. 10 and 14A and B, the front wheel assembly 340' as shown may be provided with a wheel assembly frame 344', a steering assembly 350', and a pair of hub assemblies 402.

Each hub assembly 402 includes a drive assembly 404, a suspension assembly 406, brake assembly 408, and hub 410 upon which a wheel is to be mounted. The front wheel assembly 340' of FIG. 10 may provide steering capability, motive and braking force to the trailer 1', as well as serving as a suspension, to isolate or minimize the effects of irregular surface features from the frame while the trailer is in motion. The front wheel assembly 340' of FIGS. 10 and 14 however features marked differences from those wheel assemblies described previously; for example, each wheel assembly is provided with a single steering actuator, rather than two steering arms as previously described, resulting in a simpler, more cost effective design, where each wheel of the wheel assembly is maintained at a consistent angle, relative to the other wheel of the wheel assembly through the use of a mechanical linkage, such as a tie rod, extended between each hub assembly to ensure each hub assembly's steering angle consistent with the other.

The wheel assembly of FIGS. 10 and 14 may be deployed as either, or both, of the front and rear wheel assemblies. It is contemplated that one of the wheel assembly embodiment depicted in FIG. 10 may be combined with a different embodiment of a wheel assembly, for example, the wheel assembly described previously with reference to FIG. 8.

In an embodiment, the wheel assembly frame 344 may provide support for mounting the other wheel assembly components from, and may be, for example, a truss or beam extended between the aforementioned u-shaped low friction guides 348 configured to slide upon the frame rails 13.

Each of the hub assemblies 402 may have a suspension assembly that allows the independent movement of the wheel hub, relative to the wheel assembly frame, and the trailer it is affixed to, as the trailer traverses uneven ground. As depicted in FIG. 9A, and in greater detail in FIG. 11A (and in cross-section view in FIG. 11B), as well as FIG. 13, the suspension assembly 406 may be fixedly mounted to the pivotable portion of the hub assembly fitted between the arms of the yoke 422 of the wheel assembly frame. The suspension system may be any suitable suspension known to those skilled in the art, and be capable of allowing at least some freedom of movement, generally in a vertical direction, relative to the frame of the trailer. In the embodiment depicted in FIG. 11A, the suspension assembly 406 for each of the hub assemblies may be a torsion suspension system, providing an exterior housing 430 of a square profile tube affixed by a bracket to the suspension mount 420, which may be pivotably secured to the yoke 422. The suspension assembly 406 may further provide a torsion rod 432 in the form of an elongated form having a square profile suspended within the exterior housing 430 by a plurality of resiliently deformable elements 436 that occupy at least a portion of the space between the torsion rod 432 within the housing 430. In an embodiment, the suspension assembly, in a resting state, may have deformable elements 436 in the form of elastic cords that are situated against the flat surfaces of the interior square torsion rod 432, and simultaneously situated in the corners within the exterior housing 430. The interior square torsion rod 432 may be fixedly secured to the sprung portion of the hub assembly, whether the motor housing or the hub, via a torsion arm 438, as can be seen with reference to FIG. 11A. It is contemplated that the torsion suspension components need not be limited to being square in cross-section, and other cross-section profiles, so long as the interior rod may rotate within the confines of the exterior housing, where the rotation induces resilient deflection or resilient shear stress in the deformable elements 436 between the exterior housing and internal rod components.

Figure 15:
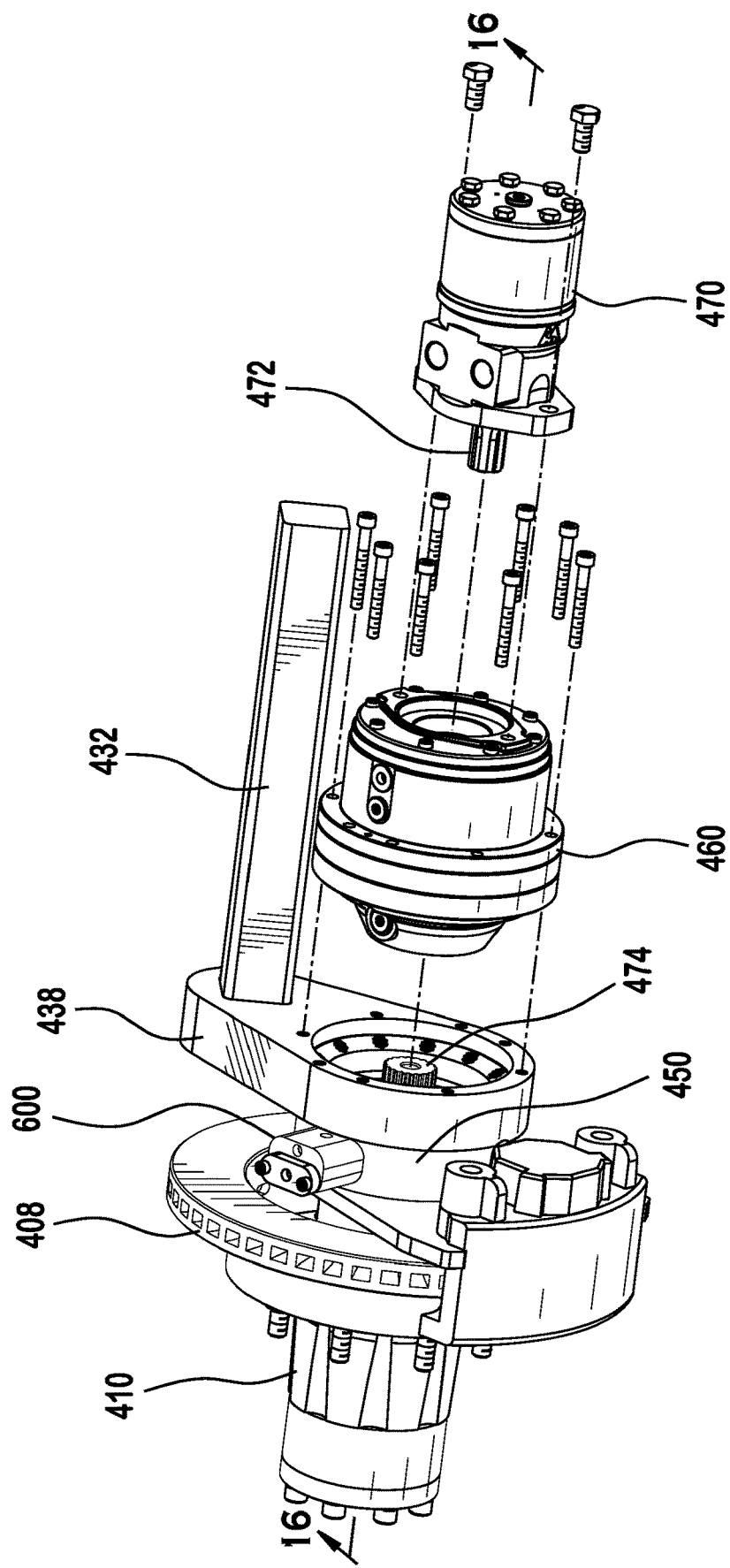
FIG. 15 is a partially exploded view of components of the wheel hub assembly depicting the motor, transmission, torsion arm, brake assembly and hub.

In an embodiment, the torsion arm 438 may be secured to any of the wheel spindle, the drive motor housing, the gear reduction housing, or the hub to which the wheel is to be mounted. As shown in FIG. 15, the torsion arm 438 at one end connects to the torsion rod 432, and at the other end of the torsion arm secures to the bell housing 476 that forms the wheel spindle 450, as well as receiving the transmission housing 460.

In operation, as the trailer 1' encounters uneven ground, each wheel may independently travel in an arc that is generally in a vertical direction (relative to the trailer frame), as the wheel, through the connecting torsion arm 438, causes the torsion rod 432 to rotate within the housing 430, resulting in the distortion of the plurality of resiliently deformable elements 436 fitted against the internal torsion rod 432 within the housing 430. Thus, the suspension serves to accommodate the vertical wheel movement, and further serving to dampen the rebound as the travel is reversed. As the wheel rebounds to its original position, the plurality of resiliently deformable elements 436 within the housing return to their initial resting shape, the rebound energy dissipating due to hysteresis, as the deflection is decreased. In an embodiment, the resiliently deformable element 436 is made from any suitable material capable of repeatedly responding resiliently to distorting forces; such deformable materials include, as non-limiting examples, rubber, and polyurethane. It is contemplated that variations in the construction of the suspension assembly would allow the suspension to accommodate a wide range of suspension travel or weight capacity. For example, a longer wheel travel may be accomplished by using a torsion arm 438 having a relatively greater length, while a greater weight capacity may be achieved by using a torsion arm 438 having a relatively lesser length, or alternatively by extending the length or other dimensions of any of the housing, deformable elements, and/or internal square rod, in order to adjust the suspension properties. The characteristics of the suspension may also be tuned by varying the shore hardness of the material comprising the resiliently deformable elements 436. It is contemplated that alternative profiles and shapes of the suspension components are possible and may be utilized similarly to achieve a functional suspension element. It is also contemplated that the resilient element may be placed in shear stress, rather than deformation stress to achieve the suspension characteristics sought, where the deformable material is secured to the internal dimensions of the exterior housing 430, and also the exterior of the interior torsion rod 432, so that suspension travel resulting in rotary movement of the torsion rod within the exterior housing places the deformable material in shear stress, which will return to initial state as the suspension is allowed to rebound.

In an exemplary embodiment, and with reference to FIG. 15, each of the hub assemblies of the trailer may include a drive assembly that is configured to selectively transmit a motive force through the drive assembly to cause the hub 410, and thus a wheel mounted upon the hub to turn, thereby propelling the trailer 1'. As can be seen with reference to the partially exploded view provided by FIG. 15, a motor 470 may be provided, which may be a hydraulic motor as depicted, though it is contemplated that the motor may instead be any suitable motor, including electric or pneumatic, which when actuated will result in the rotation of the motor output shaft 472 in a selectable direction. In an embodiment, the drive and direction of rotation of the motor 470 for each of the hub assemblies are independently, selectively reversible, so as to provide maximum maneuverability to the trailer 1' and minimize the turning radius. The rotatable motor output shaft 472 is directed into an input opening in a transmission housing 460, which may contain a gear reduction system, for example, a planetary gear set which serves to increase the torque output from the motor, while reducing speed of rotation. The output from the transmission housing 460 is directed to a driveshaft 474 and clutch assembly 500 of the drive system. The driveshaft, at its ends, is splined or otherwise keyed. The first end of the driveshaft may be mechanically engaged with the transmission output, and may be capable of laterally sliding towards and away from the transmission output, while remaining mechanically engaged with the transmission output, which is itself similarly splined or keyed in order to accept and positively engage the driveshaft. The driveshaft, at the second end, is also splined or otherwise keyed so as to be mechanically engaged with the driving clutch element 502, which may be secured by a faster, such that the driving clutch element will rotate and move with the driveshaft, as will be discussed. The driveshaft 474 may slidably, and rotatably, extended through a bell housing 476, upon which a wheel hub 410 may be rotatably mounted upon wheel bearings 482 and 484. The bell housing 476 may be secured to the end of the torsion arm 438, such that the driveshaft may transmit the rotating force of the motor along its length, directed through the mounting arm for the suspension, and is selectively engageable through a clutch assembly 500, with a hub 410, upon which the wheel is to be mounted. It is contemplated that the transmission housing 460 and gear reduction may not be needed where the motors have sufficient torque to move the trailer without requiring a transmission providing gear reduction; in such an embodiment, the output shaft from the motor 470 may drive the wheel movement at a 1:1 ratio (motor to wheel rotation), and may utilize a driveshaft and clutch as described herein.

Figure 12A:
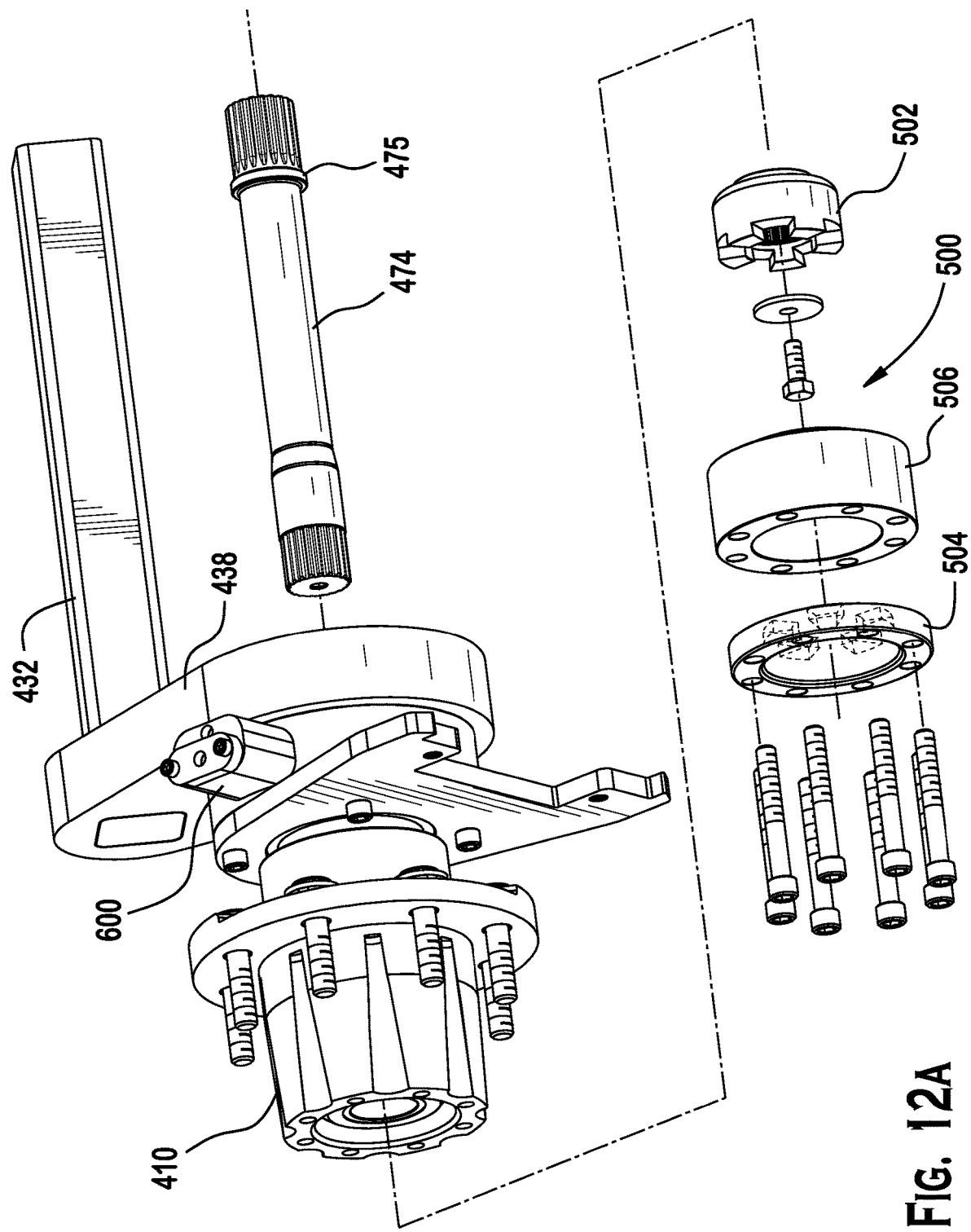
FIG. 12A is a partially exploded view of components of the drive assembly and hub assembly, including flanged driveshaft, clutch assembly, locking mechanism, and hub.
Figure 12B:
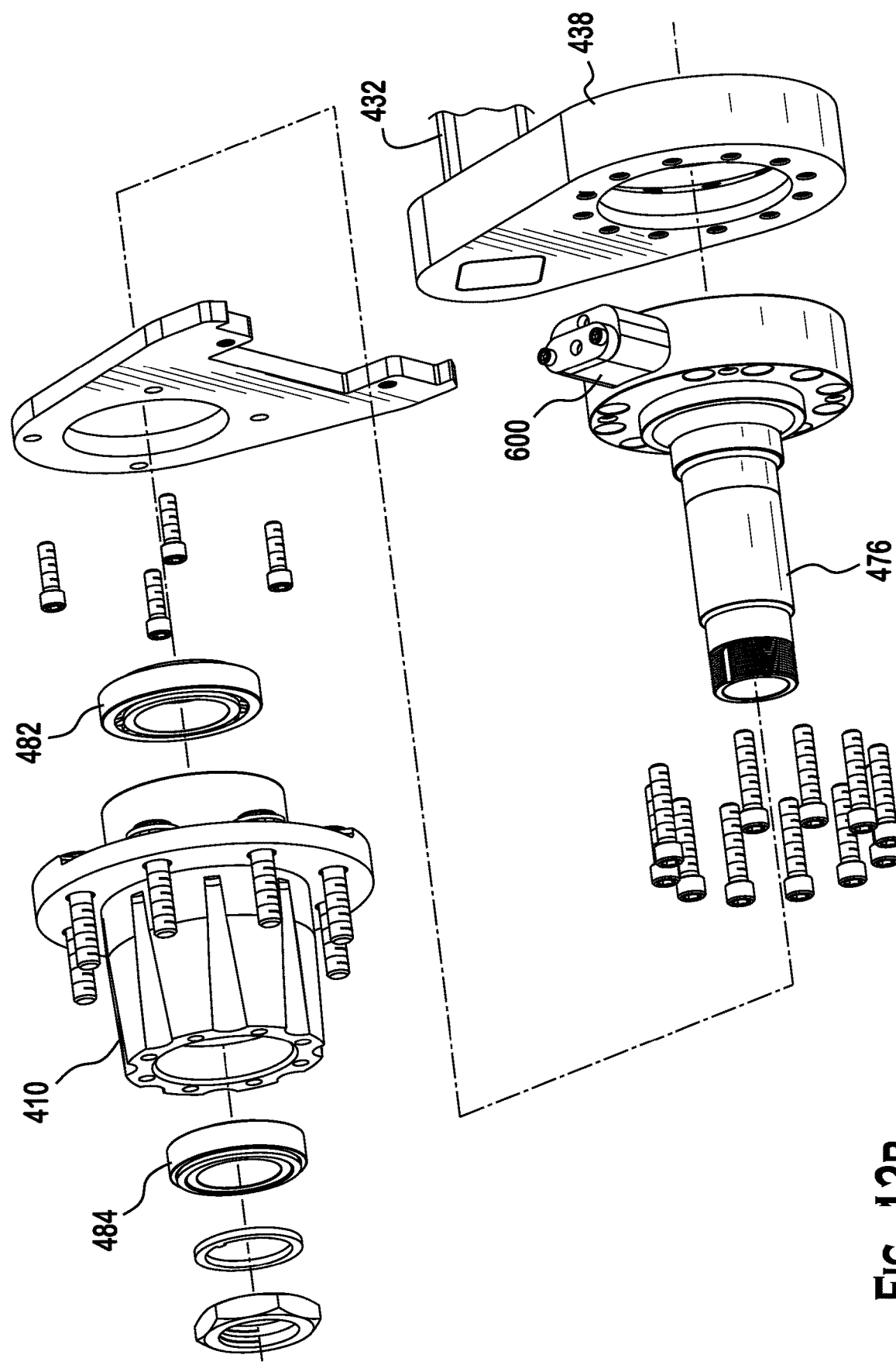
FIG. 12B is a partially exploded view of components of the drive assembly and hub assembly, including a bell housing, hub, and torsion arm.

As shown in FIG. 12A, the wheel assembly may be provided with a selectively engageable clutch assembly 500, allowing each wheel of a wheel assembly to be driven by the motor, or to allow the hub/wheel to free-wheel independently of any rotation of the driveshaft. While the clutch is engaged, motive forces provided by the motor 470 are directed through the transmission 460, if any, and then by the driveshaft 474, whereby the motive forces may be passed through the clutch assembly 500 to cause the rotation of the hub assembly upon which the wheel is mounted, thereby driving the wheel. While the clutch 500 is disengaged, the wheel and hub assembly may spin freely in a manner that is independent of the driveshaft 474 and motor 470, as may be required while the trailer 1' is being towed by a powered vehicle. The clutch assembly 500 may be of any suitable type for selectively transmitting torque from the motor to the wheel, as is understood by those skilled in the art, and may include friction, centrifugal, diaphragm, positive, hydraulic, electromagnetic, or vacuum clutches, as non-limiting examples, which may be controlled (engaged/disengaged) in manners known in the art.

As can be seen in FIG. 12A, there is depicted a positive-type clutch 500 that is a variation of a toothed clutch, positioned at the second end of the drive shaft 474 positioned away from the motor 470 and transmission housing 460. The driveshaft 474 second end may be securely mated to a driving clutch element 502, depicted here as a toothed driving clutch element.

The hub 410 to which the wheel may be mounted, as depicted in FIG. 12A, may be secured to a driven clutch element 504, depicted here as an outer plate that is secured to a spacer 506, which is in turn secured to the hub 410 by a plurality of fasteners. The clutch assembly 500 is depicted in greater detail in FIGS. 17A and B. The driven clutch element 504 provides a keyed first surface that is normally directed inwards, towards the driving clutch element, and a second surface that is normally exterior facing, and directed away from the driving clutch element 502. The driven clutch element 504, when positioned with the keyed first surface as the inner surface (facing the driving clutch element 502) may be provided with one or more features, such as teeth, or spaces to receive the teeth of the driving clutch element 502, such that the driven clutch element 504 may positively engage the driving clutch element 502, to effect rotation of the wheel as the driveshaft 474 is rotated, while the clutch is engaged.

Figure 16:
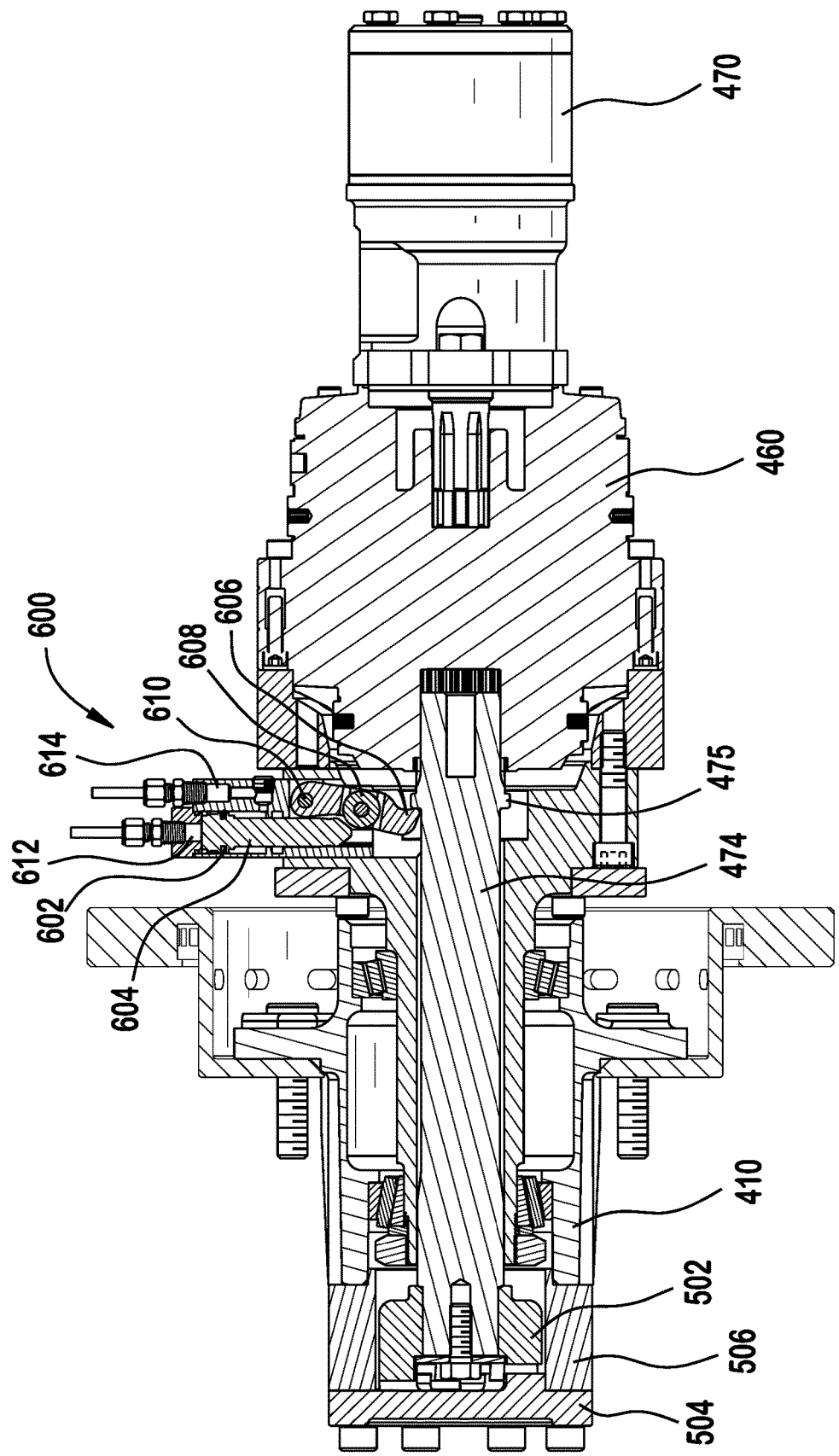
FIG. 16 is a cross-section view of components of the wheel hub assembly.

The operation of the clutch 500 will be discussed with reference to FIG. 16, depicting components of the wheel hub assembly partially in cross-section. As noted before, the motive force is provided by a motor 470, with the motor output shaft passing to a transmission 460 providing gear reduction to increase the effective torque of the motor. The transmission is not depicted in detail, but would be well understood by those skilled in the art, and may be, for example, a planetary gear arrangement, or any suitable transmission that multiplies an input torque to an output drive shaft. Output from the transmission is directed to a driveshaft 474 extending from the transmission towards the wheel hub 410. The flanged driveshaft 474, as depicted in FIG. 16, is configured to slide enough to allow clutch engagement and disengagement, in a direction towards and away from the transmission housing 460, while maintain the engagement with the transmission output, which may be, for example, meshed gears or keyed segments that allow for the lateral movement of the driveshaft. The flanged driveshaft 474, at its end opposite from the motor 470 and transmission 460, is secured or otherwise mated to the driving clutch element 502, so that it rotates and moves laterally in concert with the driveshaft. In operation, the flanged driveshaft 474 may shift between a first position, and a second position. In an embodiment, the driveshaft 474 is normally biased to the first position by a compressible spring (not shown) that may become reversibly compressed when the flanged driveshaft 474 is urged into the second position, as will be discussed further. While in the first position, the flanged driveshaft 474 is somewhat shifted laterally away from the motor 470, yet remains engaged within the splines of the transmission output, and engages the clutch 500. While the flanged driveshaft 474 is in the second position, it will be shifted laterally towards the motor 470, and disengages the clutch 500. Regardless of the position of the driveshaft, it will remain engaged with the splines of the transmission output, and thus will rotate with the transmission output.

Figure 17A:
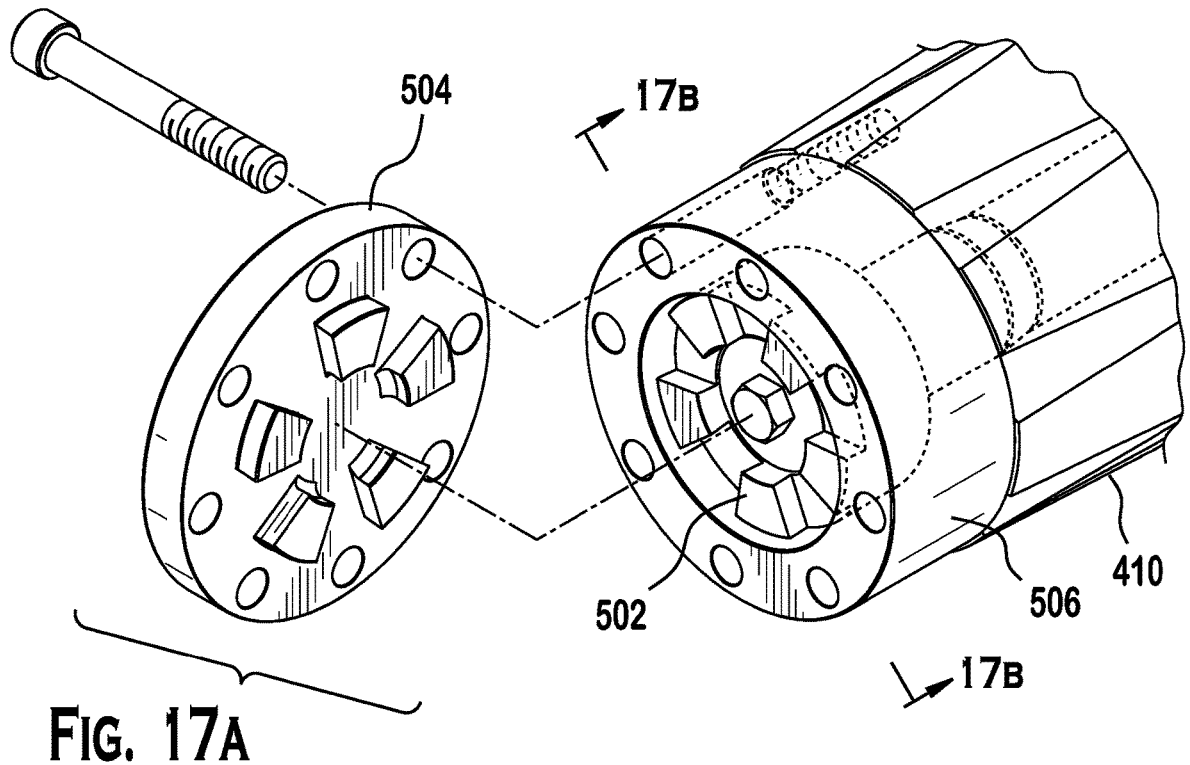
FIG. 17A is close up view of the clutch assembly, depicting the driving and driven clutch elements.
Figure 17B:
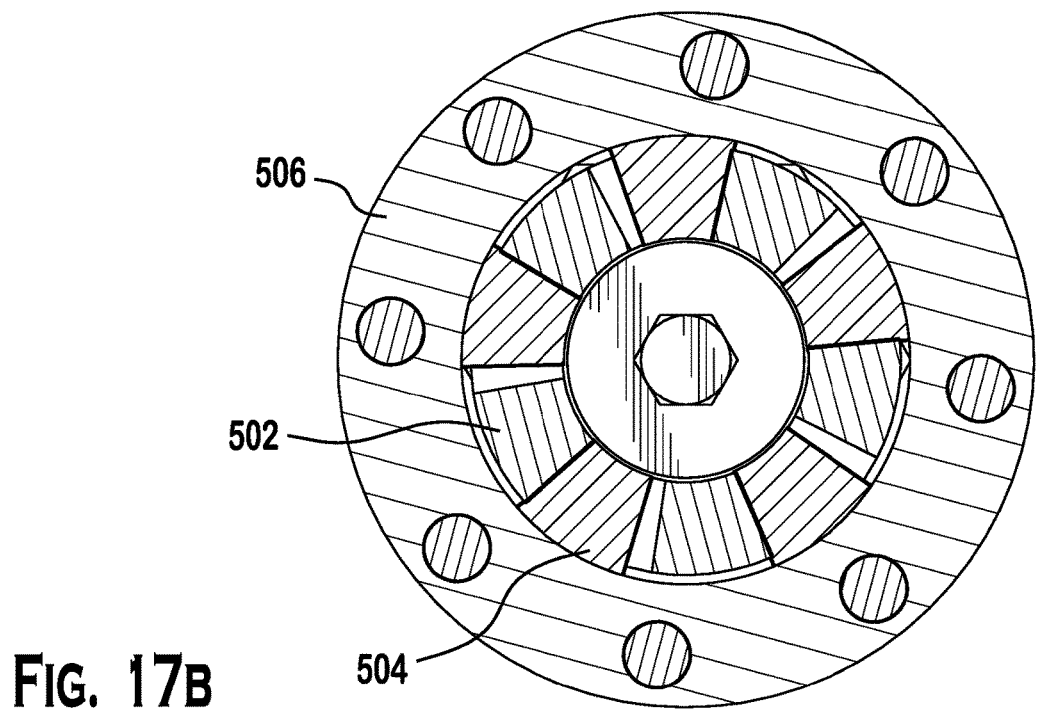
FIG. 17B is a cross-section view through the engaged clutch elements, depicting the teeth of each of the driving clutch element against the teeth of the driven clutch element.

As can be seen with reference to FIGS. 16, 17A and 17B, the clutch assembly 500 mechanism will be engaged or disengaged with the shifting of the flanged driveshaft 474. While the driveshaft is in the first position, the teeth of the driving clutch element 502 will be engaged with the receiving elements (such as teeth) of the driven clutch element 504, in order to positively transmit the rotation of the flanged driveshaft 474 through the clutch 500 elements and to the wheel hub 410. While the flanged driveshaft 474 is in the second position, the teeth of the driving clutch element 502 will not be engaged with the receiving elements of the driven clutch element 504, as the lateral shift of the driveshaft 474 is enough to separate the driving clutch element 502 from the driven clutch element 504. Thus, so long as the driveshaft 474 remains in the second position, the driveshaft 474 may be caused to rotate by the motor, and the driving clutch element 502 will also rotate, yet there as there is no contact between the driving clutch element 502 and the driven clutch element 504, then the driven clutch element 504, wheel hub 410 and wheel will remain isolated from movement of the driveshaft and motor, if any; moreover, while the trailer 1' is being towed, the driven clutch element 504, wheel hub 410 and wheel will be free to turn, without affecting the driveshaft 474 and motor 470.

To actuate the lateral movement of the flanged driveshaft 474 in order to engage and disengage the clutch, the wheel hub assembly may be provided with a locking mechanism 600, which may be any suitable actuation, including manual, electric, hydraulic, or pneumatic operation. In the exemplary embodiment depicted in FIG. 16, the locking mechanism 600 is a hydraulic actuator, that selectively urges the driveshaft 474 laterally, so as to facilitate the engagement and disengagement of the clutch assembly 500.

In any embodiment, the motor and transmission should be able to be selectively isolated from the rotation of the wheel upon the hub 410, so as to allow the trailer 1' or 1 to be towed by a powered vehicle between locations. In an embodiment, the clutch assembly 500 components may be separated by the lateral movement of the driveshaft, or any other clutch actuation methods. The drivetrain isolation (e.g., clutch disengagement) may be capable of being maintained for trailering, even in the absence of power to the system. For example, where the clutch actuation is driven by hydraulic power, it may be desirable to power down or otherwise remove the pressure from that portion of the hydraulic system (as may be preferred for towing the trailer between locations), and continue to have the driveshaft urged in a direction that results in clutch disengagement. Thus, with the clutch disengaged, the trailer 1' may be towed as the hub 410 can free-wheel, without the clutch 500 elements being engaged, and without causing unwanted movement of the motor 470 and transmission 460 components. When appropriate, the clutch may be re-engaged, so as to allow the trailer to be self-propelled again, such as by re-pressurizing the appropriate hydraulic system. The locking mechanism 600 may be capable of retaining the clutch in a disengaged state, for towing the trailer, when the trailer is powered down, and hydraulic system is depressurized.

In an embodiment, it is contemplated that the driven clutch element 504 of FIG. 17A may be reversible, so as to present the recessed surface towards the driving clutch element 502. When reversed in this manner, the clutch 500 will be disengaged, regardless of the position of the driveshaft 474, such that the hub 410 will free-wheel, though remains subject to braking application, as previously described. In this manner, one wheel hub assembly drive may be disabled, as may be necessary in the event of a malfunction, or equipment breakage. Reversal of the driven clutch element 504 is accomplished by removing the fasteners securing the driven clutch element 504, and replacing it with the normally exterior facing recessed surface (as can be seen in FIG. 12A) directed inwards.

Each hub assembly for each of the wheel assemblies for the trailer 1' may have a brake assembly 408, by which the rotation of the wheels on the wheel assembly may be selectively slowed, or stopped from rotation. In the exemplary embodiment of the wheel assembly of FIGS. 10 and 14, each brake assembly 408 is provided with a brake rotor, located adjacent to the wheel hub 410, where each brake rotor may be acted upon by a brake caliper (as can be seen in FIG. 10). As depicted herein, a hub 410 is any suitable mount for a wheel, as is commonly known, and typically fits concentrically within a center opening of a wheel, and may be secured with one or more fasteners, such as lug nuts secured to wheel studs. The brake disk would rotate with the wheel and hub assembly as is commonly known, while the trailer is moving, and the brake caliper would apply a braking force via a brake pad against the surface of the brake disk, whereby friction between the brake disk and the brake pad will slow, and ultimately prevent the rotation of the wheel on the hub. The brake assembly 408 may be actuated hydraulically, electrically, pneumatically, or mechanically. It is contemplated that any of the brake assemblies may be actuated independently, so as to slow or prevent the rotation of any single wheel, or alternatively, the brake assemblies may be actuated in pairs (fronts or rears) together, or further, the brake assemblies may be actuated all together, so as to provide four wheel braking, or prevent rotation of all four wheels simultaneously. It is contemplated that one or more of the brake assemblies may be actuated to secure the trailer 1' in a desired position, acting as a parking brake. Any of the brake assemblies 408 may alternatively employ a pair of brake pads applied against each surface of the brake disk, as is common conventionally with automobiles. Given that relatively low speeds would be anticipated with the trailer system, as it is moving under its own power, it is also contemplated that the braking system may alternatively employ a single brake pad applied against the brake disk surface. In an alternative embodiment, it is contemplated that alternative braking solutions are possible, using, for example, drum brakes as are well understood, or alternatively, using a hydraulic drive system, which may provide braking force for the trailer, whether as a supplement to the disk brake system previously described, or as a replacement, such that the hydraulic system may include a motor that may function as the brake system for the trailer, obviating the need for a disk and caliper brake system, such as where the hydraulic motor system is employed to provide fluid resistance to the rotation of the wheel and hub, thereby providing braking or locking of the wheel and hub from rotation.

Now with reference to the Figures, the control system 60 will be discussed and generally includes a power system source (i.e. combustion engine, battery) and a control assembly connected (hydraulic and electrical lines) to the rear wheel assembly 310, the front wheel assembly 340, and the extension assembly 380.

Regardless of the specific mode of powering the rear wheels 312, the control system 60 controls starting, stopping and turning the rear wheels 312, as well as for regulating the speed of the rear wheels 312. Likewise, the control system 60 also controls starting, stopping and turning the front wheels 342, as well as for regulating the speed of the front wheels 342.

The control system 60 includes a plurality of controls which may be a series of buttons, levers, or other suitable controls which allow the operator to control expansion and retraction of the front wheel assembly 340 using the extension assembly.

In an embodiment, user controls may be provided on the control system 60 for controlling certain other features of the trailer 1. As shown in the embodiment of FIG. 1, an operator stand may sit in operator's box 62, allowing an operator to move along with the trailer 1 as the operator controls the trailer 1 movement. The control system 60 therefore provides the operator with the ability to control all features of the trailer 1 from a single location, while standing on the operator stand and moving along with the trailer 1 as the trailer 1 travels under its own power.

In a trailing position A, the front wheels 342 are positioned adjacent to the rear wheels 312, while in the self-propelled position B the front wheels 342 are positioned to equally support the undercarriage chassis 20 and, more particularly, the storage bin 80.

According to the invention, the front wheels 342 are positioned between the trailing position A and the self-propelled position B by the extension assembly 380.

Now with reference to FIGS. 1-4, the storage bin 80 generally includes a platform 82, a plurality of retaining walls 84, a tailgate 90, and a pair of cover sections 94.

The platform 82 includes a planar section extending substantially parallel with the frame 10. In the shown embodiment, the platform 82 is a rectangular metal plate. However, one skilled in the art should appreciate that the platform 82 could be manufactured using different shapes and other materials, such as lumber, composite, and other metals. For instance, the platform 82 may include a framed metal structure on which a plurality of wood planks are arranged.

The plurality of retaining walls 84 includes a pair of side retaining walls 86 and a retaining end wall 88. In the shown embodiment, each retaining wall 84 is metal plate. However, one skilled in the art should appreciate that each retaining wall 84 could be manufactured using other materials, such as lumber, composite, and other metals. For instance, each retaining wall 84 may include a framed metal structure on which a plurality of wood planks is disposed along the framed metal structure.

The plurality of retaining walls 84 is positioned and secured along outer edges of the platform 82 and, in particular, along a top planar surface thereof. In the shown embodiment, the pair of side retaining walls 86 are positioned along opposite longitudinal sides of the platform 82, while the retaining end wall 88 is positioned at trailing end of the platform 82. Each retaining wall 84 extends substantially perpendicular with respect to the top planar surface of the platform 82. Each retaining wall 84 is mechanically secured to the platform 82, for instance, using a weld or plurality of known mechanical fasteners. In addition, the retaining end wall 88 is secured to a pair of common ends of the side retaining walls 86. In the embodiment shown, the retaining end wall 88 is mechanically secured to the pair of side retaining walls 86, for instance, using a weld or other known mechanical fasteners or adhesives.

As shown, the tailgate 90 is positioned along a leading end of the platform 82, opposite the retaining end wall 88 positioned along the trailing end thereof. In the embodiment shown, the tailgate 90 is made of a metal. However, one skilled in the art should appreciate that the tailgate 90 could be manufactured using other materials, such as lumber, composite, and other metals. For instance, tailgate 90 may include a framed metal structure on which a plurality of wood planks is disposed along the framed metal structure.

As shown, the tailgate 90 is positioned along an outer edge of the platform 82 and extends substantially perpendicular to the top planar surface thereof. The tailgate 90 is secured to the platform 82, for instance, through a rotating fastener device, such as a rotating hinge 92 positioned at bottom of the tailgate 90 and connecting to the platform 82. The rotating hinge 92 permits rotation of the tailgate 90 from a secured closed vertical position to one in which the tailgate 90 rotates away from the retaining end wall 88 making the platform 82 accessible. However, one skilled in the art should appreciate that other design are possible. For instance, the tailgate 90 may be pivotably mounted to side retaining walls 86 such that the tailgate 90 pivots away from the outer edge of the platform 82 or from the side retaining walls 86, much like known dump trucks.

Each cover section 94 is a rectangular metal structure having a planar surface. Each cover section 94 is positioned along and connected to upper outer edges of the pair of side retaining walls 86 using a plurality of hinges 96. However, one skilled in the art should appreciate that other designs are possible. For instance, other known rotating mechanisms could be used. Each cover section 94 measures approximately half a width as measured between the pair of side retaining walls 86.

A pair of stops 98 are provided and positioned along a common side at opposite ends of the cover section 94. In particular, each stop 98 is disposed along an outer edge of the cover section 94 that is proximate to the side retaining wall 86 when assembled. Each stop 98 is a metal plate having one end secured to the cover section 94. In an exemplary embodiment, the stop 98 is semi-circle shaped having a free end configured to abut the side retaining wall 86 when the cover section 94 rotates about the hinge 96. The stop 98 configuration determines that angle at which the cover section 94 is positioned in an open position. For instance, if the stop 98 has a 135 degree semi-circle shape, then the cover section 94 will be positioned at a 45 degree angle with respect to a plane extending across top surfaces of both side retaining walls 86.

In the shown embodiment, a plurality of wall supports 99 are provided and disposed along outer surfaces of the platform 82, the retaining walls 84, the tailgate 90, and the cover sections 94. The wall supports 99 provide reinforcement for the planar surfaces of each of the outer surfaces. In the shown embodiment, each wall support 89 is a tubular structure of metal that is mechanically secured to the outer surfaces, for instance, using a weld. However, one skilled in the art should appreciate that other known fastening means are possible, including but not limited to screws, nuts and bolts, and adhesives.

Now with references to FIGS. 4-6 and 8, the extension device 100 according to the invention will be described. As shown, the extension device 100 includes the following major components: a first extension section 102, a second extension section 120, and a storage bin platform section 180.

As shown, the first extension section 102 is shown and generally includes a pair of lower supports 104 reciprocally connected to the support beams 12 and a lower lifting actuator assembly 106 connected to the front support 16.

Each lower support 104 is an elongated structural support and, in the shown embodiment, a metal plate. Each lower support 104 includes a plurality of fastener receiving through-holes 108 positioned at a trailing end, leading end, and a middle section thereof. The pair of lower supports 104 are positioned parallel, and are rotatably secured to the frame 10 using fasteners. The lower lifting actuator assembly 106 includes a pair of hydraulic actuators connecting to the front support 16 at one end and to the middle section of the lower support 104 at another end thereof using fasteners.

As shown, the second extension section 120 is shown and includes a boom support 122, a sliding support 124, a sliding mechanism 130, an upper lifting actuator assembly 140, and an articulating arm assembly 150.

The boom support 122 is elongated structural beams and, in the shown embodiment, a tubular metal beam. The boom support 122 includes a pair of fastener receiving brackets 123 with through holes positioned at a trailing end thereof and extending completely there through.

As shown, each sliding support 124 is an elongated structural beams having a boom support receiving passageway 126 opening from a trailing end thereof and extending there through a body of sliding support 124. The boom support receiving passageway 126 is shaped to receive the boom support 122 and, as shown, a cross section area of the boom support receiving passageway 126 is larger than a cross section area of the boom support 122. As a result, a leading end of the boom support 122 is positioned through the boom support receiving passageway 126.

In the shown embodiment, each sliding support 124 is a tubular metal beam. Each sliding support 124 includes a fastener receiving through-hole 128 positioned at a leading end thereof and extending completely there through.

The sliding mechanism 130 is positioned between and connected to the boom support 122 and the boom support receiving passageway 126.

Each sliding mechanism 130 includes an actuator section 132 which may be a known hydraulic cylinder having a barrel, a piston, piston rod, seals, and seal glands. However, one skilled in the art should appreciate that other actuator systems operated by a source of energy, such as electric current, hydraulic fluid pressure, or pneumatic pressure.

In the shown embodiment, the upper lifting actuator assembly 140 includes a pair of hydraulic actuators 142 is positioned between frame 10 and the second extension section 120. Each hydraulic actuators 142 includes an actuator 174 which may be a known hydraulic cylinder having a barrel, a piston, piston rod, seals, and seal glands. However, one skilled in the art should appreciate that other actuator systems operated by a source of energy, such as electric current, hydraulic fluid pressure, or pneumatic pressure.

As shown, in an exemplary embodiment of the invention, the articulating arm assembly 150 is a pair of plate like members (see FIG. 8) rotatably connected to the sliding support 124 and the storage bin 180 using the storage bin platform section As shown, the storage bin platform section 180 is shown and generally includes a platform 182, a platform cross member 184, a tilting actuator cross member (not shown), and a pair of bin tilting actuators (not shown).

Now with reference to FIGS. 1, 10, and 11, operation of the trailer 1 or 1' according to the invention will be described.

Building materials can be loaded and secured in the storage bin 80 at a location different than the work site. A truck (not shown) connects to the frame 10 using the trailer hitch 22. The operator positioned the front wheel assembly 340 apart from the rear wheel assembly 310 using the extension assembly 380. The front wheel assembly 340 and the rear wheel assembly 310 are set to drive and steer using the control system 60. The trailer 1 or 1' then can operate as a standard trailer and be towed behind the connected truck to the work site.

The operator then uses the control system 60 to move the trailer 1 or 1' to a desired location on the work site using the drive system of the front wheel assembly 340 and the rear wheel assembly 310, as described above. The operator may now use the control system 60 to stabilize the trailer 1 or 1'.

Once the operator has determined that the trailer 1 is in position to unload building materials from the storage bin 80, the operator can manage the stabilizers (not shown), as known and well understood by those skilled in the art, to stabilize and level the trailer 1 or 1'. The operator then uses the control system 60 to control the extension device 100 and position of the storage bin 80.

The operator can use the control system 60 to control the vertical and horizontal position of the storage bin 80. In addition, the operator can slide the storage bin 80 horizontally with respect to frame 10.

The foregoing illustrates some of the possibilities for practicing the invention. Many other embodiments and fields of use for the trailer 1 or 1' are possible and within the scope and spirit of the invention. It is, therefore, intended that the foregoing description be regarded as illustrative rather than limiting.

What is claimed is:

1. A trailer for towing by a power vehicle, comprising:
a frame forming an undercarriage chassis; and
a storage bin and an extension device connected to the frame and the storage bin to move the storage bin away from the frame, the storage bin includes a platform extending substantially parallel with the frame; and
a tandem wheel assembly positioned under the undercarriage chassis and having a rear wheel assembly and a front wheel assembly; and
an extension assembly moving the front wheel assembly between trailing position and a self-propelled position where the rear wheel assembly and the front wheel assembly are positioned to equally support the undercarriage chassis, the extension device includes a first extension section rotatably connected the frame and a second extension section rotatably connected to the first extension section, and a storage bin platform section connected to the second extension section, the second extension section is expandable and includes a boom support, a sliding support received by the boom support, a sliding mechanism moving expanding the sliding support from the boom support.

2. The trailer of claim 1, wherein the rear wheel assembly includes a rear drive assembly including a motor.

3. The trailer of claim 1, wherein the front wheel assembly includes a front drive assembly including a motor.

4. The trailer of claim 2, wherein the motor is configured for rotation in either direction, and is one of hydraulic motor, pneumatic motor, and electric motor.

5. The trailer of claim 1, wherein the frame includes a plurality of support beams positioned and secured apart by a connecting beam, a front support and a rear support.

6. The trailer of claim 5, wherein the front support includes a trailer connection section with a trailer hitch positioned on a leading end of the frame.

7. The trailer of claim 6, wherein each support beam of the plurality of support beams includes a support rail.

8. The trailer of claim 7, wherein the support rail is positioned on a lower end and running along a length thereof.

9. The trailer of claim 2, wherein each of the rear wheel assembly and front wheel assembly further comprise a steering assembly.

10. The trailer of claim 1, wherein the second extension section further includes an upper lifting actuator assembly connected to the frame and the boom support to extend move the boom support away from the frame.

\* \* \* \* \*